(12) United States Patent
Hanson et al.

(10) Patent No.: US 6,535,585 B1
(45) Date of Patent: Mar. 18, 2003

(54) SYSTEM AND METHOD FOR NOTIFICATION UPON SUCCESSFUL MESSAGE DELIVERY

(75) Inventors: Joel Hanson, Anamosa, IA (US); Douglas J. Murray, Alpharetta, GA (US)

(73) Assignee: WorldCom, Inc., Clinton, MS (US)

( * ) Notice: Subject to any disclaimer, the term of this patent is extended or adjusted under 35 U.S.C. 154(b) by 0 days.

(21) Appl. No.: 09/538,768

(22) Filed: Mar. 30, 2000

(51) Int. Cl.[7] ................................. H04M 1/64
(52) U.S. Cl. ................. 379/88.12; 379/88.26; 379/114.21; 379/222
(58) Field of Search .................. 379/67.1, 69, 70, 379/88.11–88.28, 90.01, 91.01, 91.02, 114, 115, 119, 133, 134, 135, 201, 207, 209, 210, 214, 218, 201.01, 207.04–207.09, 209.01, 210.01, 214.01, 218.01

(56) References Cited

U.S. PATENT DOCUMENTS

| | | | | |
|---|---|---|---|---|
| 5,333,180 A | * | 7/1994 | Brown et al. | 379/79 |
| 5,463,677 A | * | 10/1995 | Bash et al. | 455/458 |
| 5,550,899 A | * | 8/1996 | McLeod et al. | 379/88.25 |
| 5,646,982 A | * | 7/1997 | Hogan et al. | 379/88.22 |
| 5,684,862 A | * | 11/1997 | Finnigan | 379/207.03 |
| 5,740,229 A | * | 4/1998 | Hanson et al. | 379/67.1 |
| 5,787,150 A | | 7/1998 | Reiman et al. | |
| 5,873,032 A | * | 2/1999 | Cox et al. | 455/414 |
| 5,956,390 A | * | 9/1999 | McKibben et al. | 379/93.07 |
| 5,991,370 A | * | 11/1999 | Ladd | 379/88.25 |
| 5,999,525 A | * | 12/1999 | Krishnaswamy et al. | 370/352 |
| 6,167,127 A | * | 12/2000 | Smith et al. | 379/209 |

* cited by examiner

Primary Examiner—Fan Tsang
Assistant Examiner—Roland G. Foster

(57) ABSTRACT

A method and related apparatus for delivering a message from a calling party at a calling station to a called party at a called station, the method including: in response to an unsuccessful attempt to communicate from the calling station to the called station, storing a message from the calling station, using a messaging system, for later delivery to the called station; obtaining address information, using the messaging system, for the calling party and for the called station, from the calling station; attempting to deliver the message, using the messaging system, to the called station by initiating a communication from the messaging system to the called station using the address information for the called station that was obtained from the calling station; determining, using the messaging system, whether the message delivery attempt was successful; and, in response to successful delivery of the message, attempting to notify the calling party that the message to the called station was successfully delivered.

36 Claims, 17 Drawing Sheets

SYSTEM AND METHOD FOR NOTIFICATION UPON SUCCESSFUL MESSAGE DELIVERY

TECHNICAL FIELD

The invention relates to telephone messaging apparatus and methods. The invention also relates to automated collect call messaging systems.

BACKGROUND OF THE INVENTION

Collect calls allow a caller to transfer charges for a call to the account of the telephone station receiving the call, at the option of the called party. Traditionally, the called party would have to answer the call and accept the charges, in order for a collect call to be completed. If the called station was not answered or is busy, the call could not be completed. Therefore, methods have been devised to enable a caller to leave a message for a called party if the called station does not answer or is busy when the call is placed. See, for example, U.S. Pat. No. 5,787,150 to Reiman et al., assigned to the assignee of the present invention, and incorporated herein by reference. This patent discloses a method and apparatus wherein, if there is no answer or if the called station is busy, the messaging platform retains control of the call and automatically prompts the caller to enter a name and a message to be delivered to the called party. After the name and message have been entered, the caller is given a confirmation number, if desired, which allows the caller to determine whether the called party has received the message. The messaging platform repeatedly attempts to deliver the message by calling the called party. Upon the call being answered, the messaging platform identifies the caller and prompts the called party to accept or refuse the collect message. If the called party accepts the message, the messaging platform plays it and the called party is charged for the message.

Other methods and apparatus for leaving messages for called parties exist. These include, for example, services known as Messenger for Card, Messenger for Operator Assisted Collect, Messenger for 1-800-Collect, and Dial 1 Messenger.

Callers that leave these messages must call an 800 number to determine if their message was successfully delivered. This is inconvenient for the caller.

SUMMARY OF THE INVENTION

The invention provides a system and method to inform a caller when their message is delivered or if the message was undeliverable. Another aspect of the invention provides a system and method to locate the caller either via a pre-subscribed location or a location left upon recording the message. Pre-subscribed locations may be dynamic based upon a schedule devised by the caller.

One aspect of the invention provides a method of delivering a message from a calling party at a calling station to a called party at a called station, the method including, in response to an unsuccessful attempt to communicate from the calling station to the called station, storing a message from the calling station, using a messaging system, for later delivery to the called station, obtaining address information, using the messaging system, for the calling party and for the called station, from the calling station, attempting to deliver the message, using the messaging system, to the called station by initiating a communication from the messaging system to the called station using the address information for the called station that was obtained from the calling station, determining, using the messaging system, whether the message delivery attempt was successful, and, in response to successful delivery of the message, attempting to notify the calling party that the message to the called station was successfully delivered.

Another aspect of the invention provides a system for delivering a message from a calling party at a calling station to a called party at a called station, the system including a voice message system configured to store a message from the calling station, for later delivery to the called station, in response to an unsuccessful attempt to communicate from the calling station to the called station, a user contact database configured to store an address for the calling party and a communication technique associated with the address with which to attempt to contact the calling party to provide information concerning the status of delivery of the message to the called station, a processor configured to attempt to deliver the message to the called station by initiating a communication to the called station, the processor being configured to determine whether the message delivery attempt was successful and, in response to successful delivery of the message, to attempt to notify the calling party that the message to the called station was successfully delivered.

In operation, a caller registers his or her identity, via a data device, with a directory service. When registering, the caller also indicates one or more methods of communication and address, e.g., pager number, phone number, cell phone number or IP Address, to the directory service.

When the caller later intends to leave a message to a called party, either via card call, collect call, or Dial 1 call, upon successful delivery of the message, the processor that successfully delivered the message sends a confirmation notice to the caller. To do so, the processor queries the directory service to determine the caller's method of communication. The method of communication may depend upon time of day, day of week and/or day of year. The processor then signals the caller of the successful message delivery via the specified method of communication.

In an alternative embodiment, to find the caller, the caller is allowed to leave a telephone number, pager number, a URL or other method by which they may be contacted during the call when recording the message for the called party. Each message will have a unique identification code.

In one aspect of the invention, the system informs the caller if the message was undeliverable and was therefore cancelled.

In one aspect of the invention, when a caller intends to leave message for a called party via an automated or manual messaging service, the service either collects contact information for the user or consults a directory service to determine the user's location, the message service either delivers the message or cancels the message, and the message service notifies the caller. In one aspect of the invention, notification includes time of delivery or cancellation and message ID. In one aspect of the invention, if the message was undeliverable, the notification includes reason why message was undeliverable.

DETAILED DESCRIPTION OF THE PREFERRED EMBODIMENTS

Figure 1:
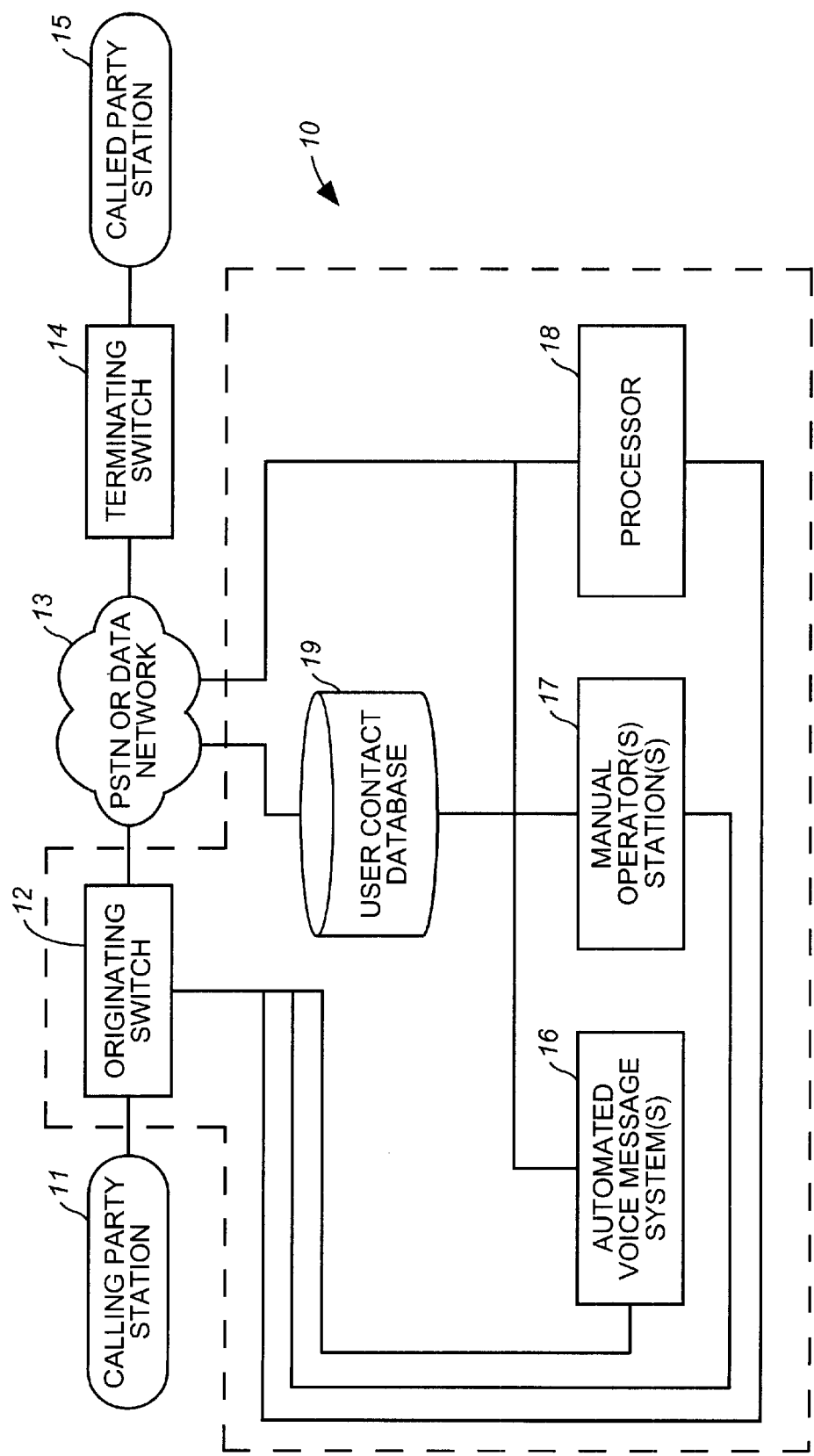
FIG. 1 is a block diagram of a system embodying the invention.

FIG. 1 shows a system 10 embodying the invention. The system 10 is used with calling and called party stations 11 and 15, respectively, such as telephones, computers, or other devices capable of being used for communications, or stations 11 and 15 can be a combination of devices such as a phone for station 11 and a pager for station 15. The system 10 further includes an originating switch 12 and communicates with the calling party station 11 and called party station 15 using a communications network 13, such as a PSTN or data network, and using a terminating switch 14.

The system 10 further includes one of more automated voice message systems 16 selectively coupled to the originating switch 12, one or more manual operator stations 17 selectively coupled to the originating switch 12, and a processor 18 coupled to the manual operator station 17, the network 13, and selectively coupled to the originating switch 12. The system 10 further includes a user contact database 19 coupled to the automated voice message system 16, manual operator station 17, and processor 18 either via a LAN, WAN, direct connection (e.g. embodied in a computer that also embodies the voice message system 16 or processor 18 or both, or by serial or parallel communications), or via the network 13. Various hardware alternatives are, of course, possible. For example, the functions performed by the various blocks could be combined into machines or computers, or distributed over multiple machines or computers that are not necessarily even in the same geographical location.

In operation, a calling party using calling party station 11 attempts to initiate a communication to called party station 15 via the communication network 13. The communication attempt results in a situation where the calling party at station 11 will record or dictate a message to be stored and delivered at a later time to the called party at station 15. This type of situation may occur when the called party at station 15 cannot be reached for any of various reasons, e.g., busy condition, no answer, answering machine, etc. This type of situation may occur, for example, when the calling party at station 11 is attempting a dial 1 call, a collect call, a card call, a Voice over IP call, or some other type of communication other than a call.

When the calling party using the station 11 records a message via the automated voice message system 16 or dictates a message to a manual operator using the manual operator station 17, the automated voice message system 16 or manual operator 17 will determine, in one embodiment, if the calling party using station 11 wishes to be contacted when the message is successfully delivered or cancelled.

If the calling party wishes to be contacted with the disposition of the recorded or dictated message, the automated voice message system 16 or manual operator 17 will determine, in one embodiment, if the user contact database 19 contains stored contact information for the calling party 11. Contact information stored in the user contact database 19 includes, for example, calling party's number or address, method of communication associated with the address; e.g., pager number, phone number, IP address, or other method, and, in one embodiment, schedules of where and how the calling party can be contacted in a particular time range, or dynamic locator services. In one embodiment, pre-set locations and schedules are determined by ANI or card number or user input.

In one embodiment, the automated voice message system 16 or manual operator at station 17 also determines if the user wishes to designate a specific method of communication and address for message disposition notification; i.e., a phone number or IP address that will override any stored schedule information, or a number or address that may be used in lieu of stored schedule information.

After determining the method of communication by which the calling party will be contacted, the message is scheduled with processor 18 for later delivery and marked to indicate calling party notification. Processor 18 attempts to deliver the message to called party 15 via the PSTN or data network 13.

When processor 18 determines the disposition of the message; i.e., the message was left successfully or was canceled, processor 18 then contacts the calling party at station 11 using either information in user contact database 19 or information provided by the calling party 11.

Appropriate retry methods are imposed upon calling party notification.

In one embodiment, the calling party is allowed to create, update and delete information in user contact database 19. For example, the calling party can create, update, or delete information by telephone (e.g., using the touchtone keypad or by asking a manual telephone operator to change the database) or other methods (e.g., by Internet).

Figure 2A:
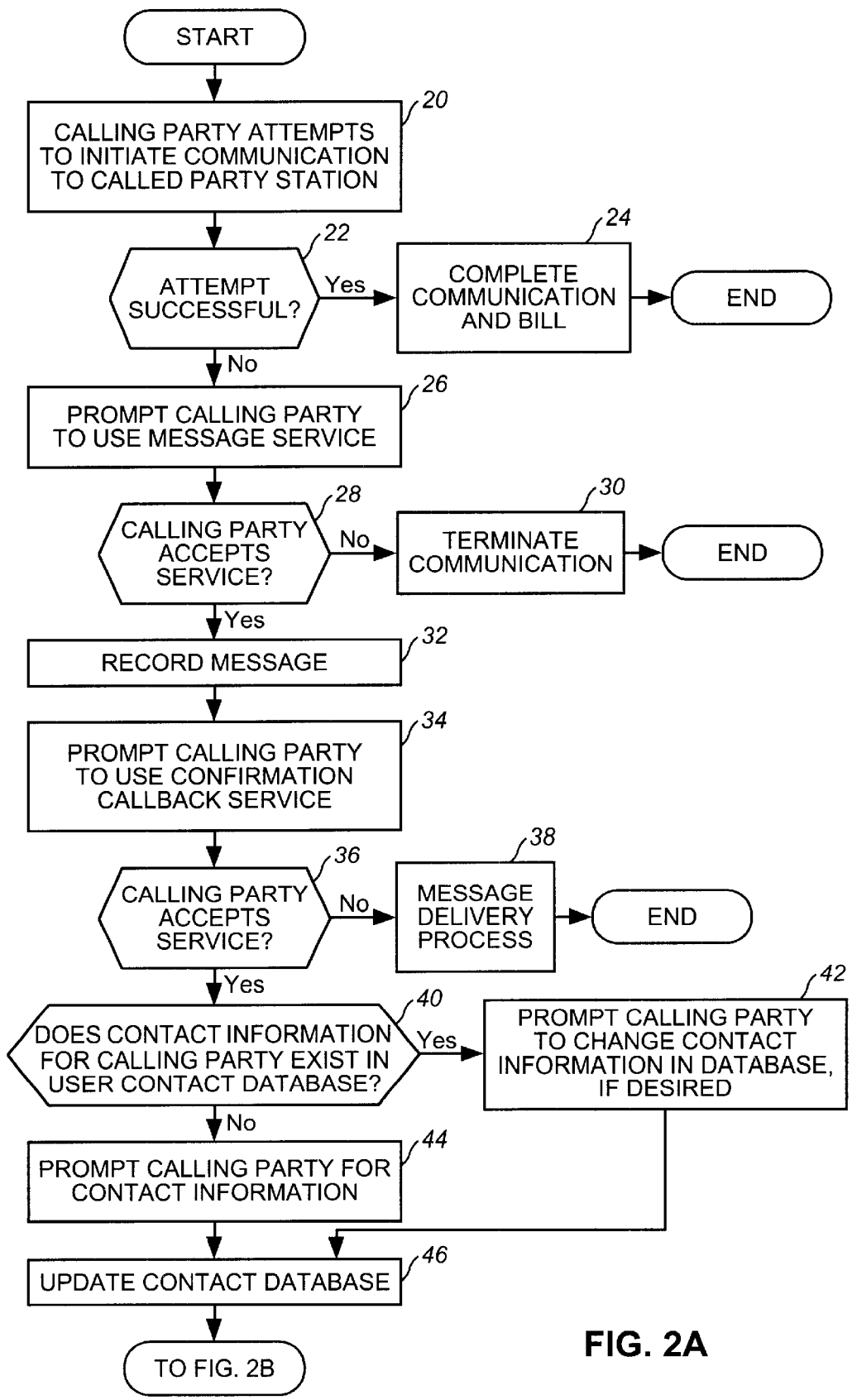
FIG. 2 is a flowchart illustrating logic performed by the system of FIG. 1 in one embodiment of the invention.
Figure 2B:
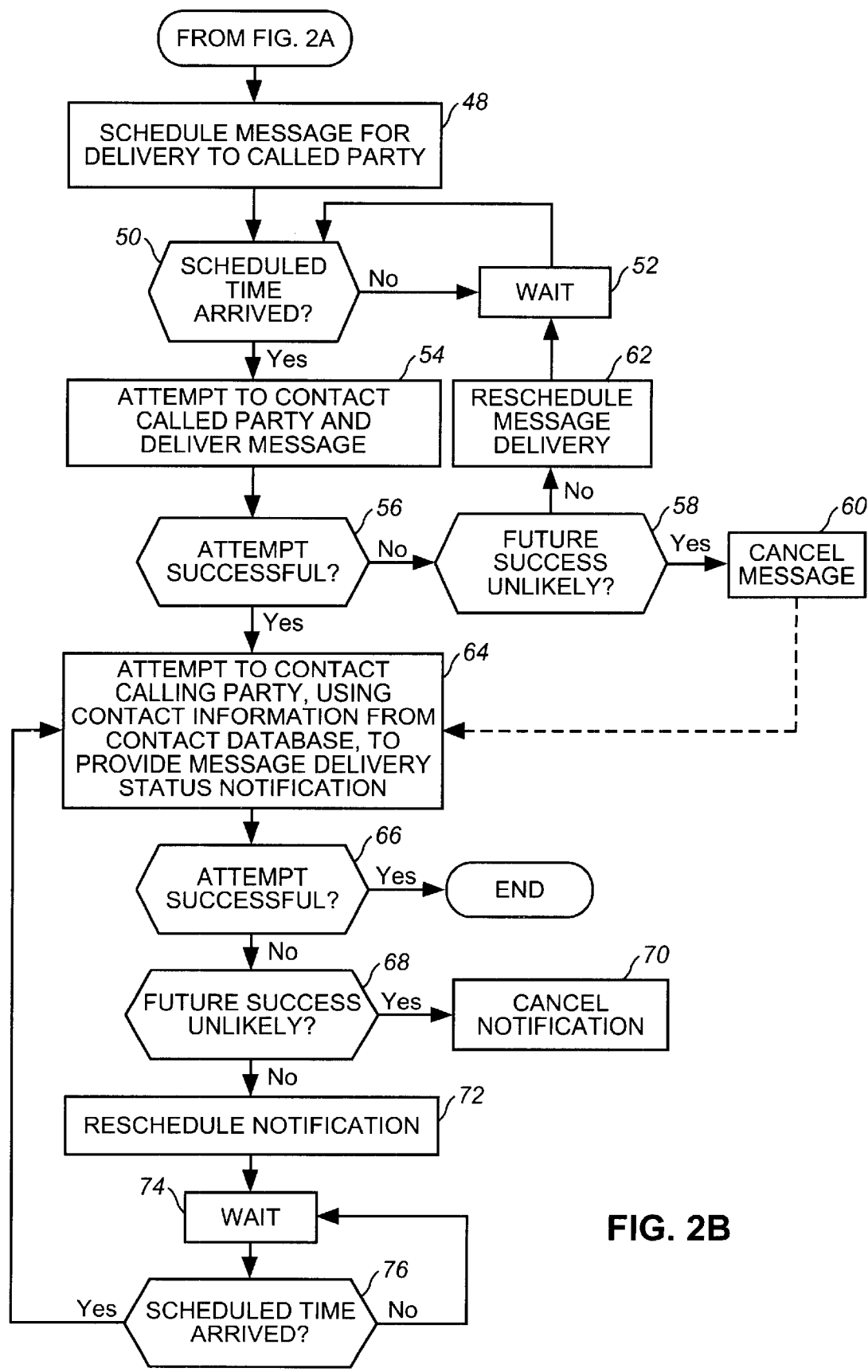

FIG. 2 is a flowchart illustrating logic performed by the system 10 of FIG. 1 in one embodiment of the invention, which is given by way of example only.

The logic is initiated, in step 20, when a calling party using the station 11 attempts to initiate a communication to the called party station 15 using the system 10.

In step 22, the system 10 determines whether the attempt was successful. If so, the system proceeds to step 24. If not, the system proceeds to step 26.

In step 24, the system completes the communication, e.g., by connecting the calling party station 11 to the called party station 15 or by transferring data to the called party station 15.

In step 26, the system asks the calling party whether they want to use a message service, since the communication was unsuccessful, e.g., by playing a message, prompting the user to responds using the touchtone keypad. After performing step 26, the system proceeds to step 28.

In step 28, the system determines whether the calling party at station 11 accepted the message service. If so, the system proceeds to step 32. If not, the system proceeds to step 30.

In step 30, communications are terminated.

In step 32, the system records a message from the calling party at station 11 for later delivery to station 15. In one embodiment, the message is assigned an identification number by the system. After performing step 32, the system proceeds to step 34.

In step 34, the system asks the calling party at station 11 whether they want to use the confirmation callback service. If so, the system proceeds to step 40. If not, the system proceeds to step 38.

In step 38, the system attempts to deliver the message in a conventional fashion, with appropriate retry and billing procedures.

In step 40, the system determines whether contact information for the calling party at station 11 exists in the contact database 19 (e.g., from preregistration, information associated with a calling card). If so, the system proceeds to step 42. If not, the system proceeds to step 44.

In step 42, the system prompts the calling party to change contact information in the contact database 19, if desired. After performing step 42, the system proceeds to step 46.

In step 44, the system prompts the calling party for contact information. In an alternative embodiment, the system checks for ANI information and uses it for the confirmation callback. After performing step 44, the system proceeds to step 46.

In step 46, the system updates the contact database 19. After performing step 46, the system proceeds to step 48.

In step 48, the system schedules the message for delivery to the called party. After performing step 48, the system proceeds to step 50.

In step 50, the system determines if the scheduled time for delivery has arrived. If so, the system proceeds to step 54. If not, the system proceeds to step 52.

In step 52, the system waits before proceeding to step 50. The system can be performing other tasks, such as running other instances of the procedure of FIG. 2.

In step 54, the system attempts to contact the called party and deliver the message recorded by the calling party. After performing step 54, the system proceeds to step 56.

In step 56, the system determines if the delivery attempt was successful. If so, the system proceeds to step 64. If not, the system proceeds to step 58. In step 58, the system determines whether future deliver success is likely (e.g., by counting number of attempts, determining if data messages are deliverable, or any other desired technique). If so, the system proceeds to step 60. If not, the system proceeds to step 62.

In step 60, the system cancels the message. In one embodiment, after performing step 60, the system proceeds to step 64. In another embodiment, after performing step 60, the system ends processing of this instance of the routine of FIG. 2.

In step 62, the system reschedules message delivery. After performing step 62, the system proceeds to step 52.

In step 64, the system attempts to call the calling party at station 11, using contact information from the contact database 19 or ANI information from when the calling party at station 11 called, to provide message delivery status notification (i.e., that the message was delivered successfully or that the message was cancelled). In one embodiment of the invention, the delivery status notification includes the time of delivery or cancellation and message identification number. After performing step 64, the system proceeds to step 66.

In step 66, the system determines whether the attempt to contact the calling party at station 11 for status notification was successful. If so, processing ends. If not, the system proceeds step 68.

In step 68, the system determines whether future success is unlikely. If so, the system proceeds to step 70. If not, the system proceeds to step 72.

In step 70, the status notification is cancelled and processing ends.

In step 72, the status notification is rescheduled. After performing step 72, the system proceeds to step 74.

In step 74, the system waits before proceeding to step 76.

In step 76, the system determines whether the scheduled time for delivery of the status notification has arrived. If so, the system proceeds to step 64. If not, the system proceeds to step 74.

While FIGS. 1 and 2 show a more generalized embodiment, the following figures describe a very specific embodiment, by way of example only. It is to be understood that the invention has application beyond those described below. For example, the invention has application to both data and telephone communications even though the embodiment described below relates specifically to telephone communications.

Figure 3:
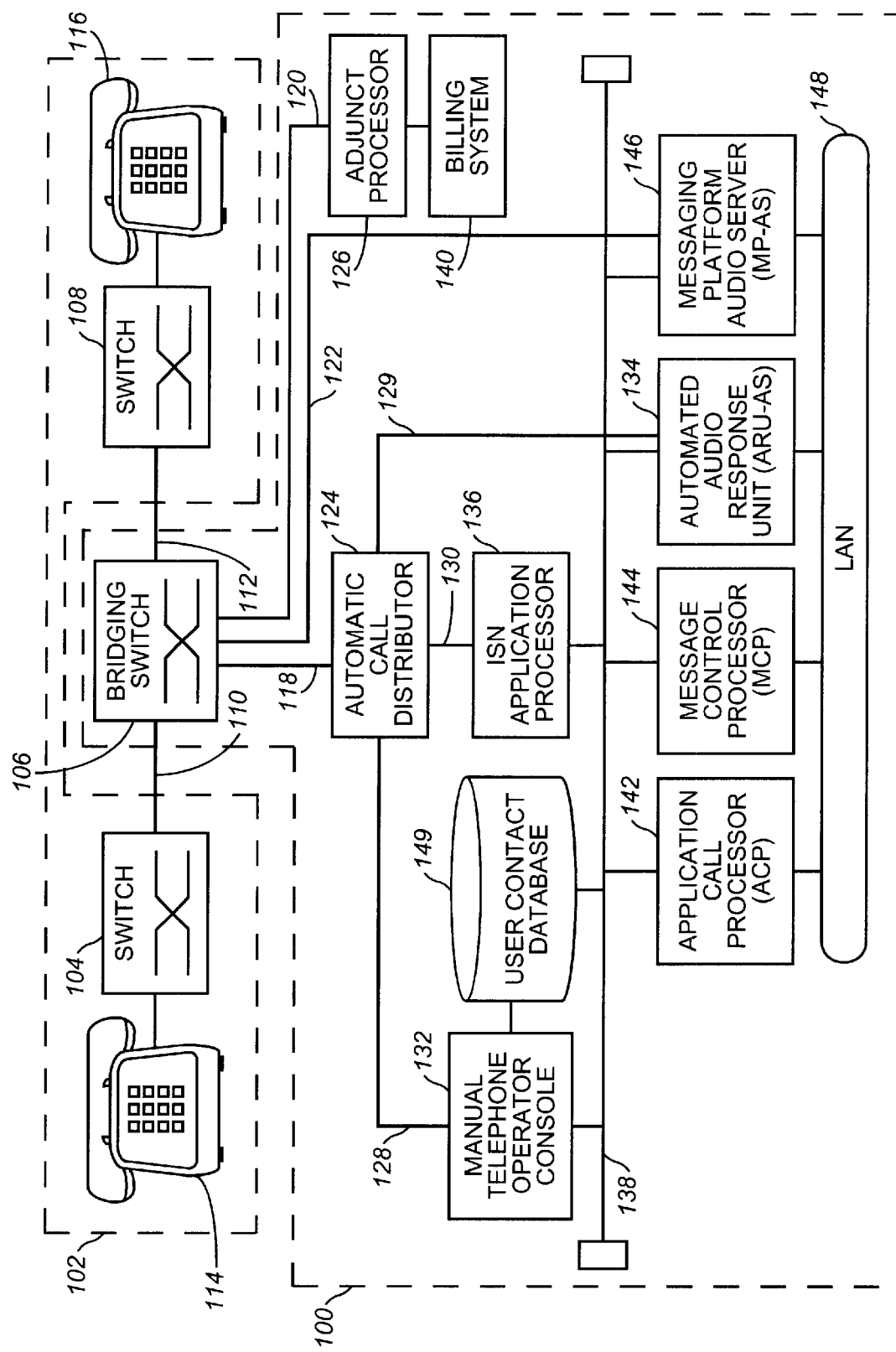
FIG. 3 is a block diagram of a collect call messaging platform in accordance with an alternative embodiment of the present invention.

FIG. 3 is a block diagram showing a collect call messaging system 100. Also shown is conventional public switched telephone network 102. As an example, the internal details of network 102 are represented by conventional switches 104 and 108, conventional trunks 110 and 112 and conventional telephone sets 114 and 116. System 100 includes bridging switch 106, connected to network 102 by trunks 110 and 112. Bridging switch 106 allows a call to be simultaneously connected among three parties. In addition to connections over trunks 110 and 112, bridging switch 106 can make connections over line 118, which connects to automatic call distributor 124 and line 122, which connects to messaging platform audio server (MP-AS) 146. Automatic call distributor (ACD) 124 routes calls for handling by either manual telephone operator console 132 or automated audio response unit/audio server (ARU-AS) 134. Automatic call distributor 124 delivers the signaling information of each call to intelligent services network application processor (ISNAP) 136 over data connection 130. Intelligent services network application processor 136 selects the type of equipment to which the call is to be routed and sends control commands to automatic call distributor 124 over data connection 130. Automatic call distributor 124 delivers the audio portion of the call to either manual telephone operator console 132 over audio connection 128 or to automated audio response unit/audio server 134 over audio connection 129. Manual telephone operator console 132 is conventional equipment with which human operators manually answer calls and manually enter information obtained from the caller. Automated audio response unit/audio server 134 is conventional equipment which automatically answers calls and obtains information from the caller. Automated audio response unit/audio server 134 does this by, for example, playing pre-recorded prompting messages to the caller and detecting touch tone keys pressed by the caller. Automated audio response unit/audio server 134 includes a conventional audio server which digitally records, stores and plays back voice messages.

Application call processor (ACP) 142 and message control processor (MCP) 144 are standard processors which control different portions of the collect call and messaging processes. Application call processor 142 and message control processor 144 implement portions of the processes which perform standard collect call service and collect messaging service. Application call processor 142 receives status information from automated audio response unit/ audio server 134 and issues commands to control automated audio response unit/audio server 134 in the collection of information required to perform standard collect call service. Application call processor 142 also receives status information from automated audio response unit/audio server 134 and messaging platform audio server 146 and issues commands to control both automated audio response unit/audio server 134 and messaging platform audio server 146 in the performance of collect messaging service. Automated audio response unit/audio server 134 is connected to automatic call distributor 124 and handles incoming calls to the system. Messaging platform audio server 146 is an audio server similar to that in automated audio response unit/audio server 134, except that it is connected to bridging switch 106 and has been arranged so that it is capable of initiating calls.

Although only single blocks are shown, system 100 and each block within represent multiple equipment pieces possibly located in diverse geographical locations, but all communicating over local/wide area network (LWAN) 138. LWAN 138 is a standard network comprising, for example, multiple interconnected Ethernet local area networks. Automated audio response unit/audio server 134, application call processor 142, message control processor 144, and messaging platform audio server 146 also communicate over local area network (LAN) 148. LAN 148 is a standard network, such as Token Ring. Although it is not required, typically, each group of automated audio response unit/audio server 134, application call processor 142, message control processor 144 and messaging platform audio server 146 are located at the same site, so LAN 148 is used to interconnect them. The use of LAN 148 allows the bulk of messaging traffic to be intercommunicated without use of LWAN 138. Messaging traffic comprises mainly digitized voice messages, which tend to comprise large amounts of data compared to the usual signaling traffic on LWAN 138. Intercommunicating messaging traffic over LWAN 138 would consume too many network resources. Use of LAN 148 avoids consumption of those resources and prevents interference with signaling traffic.

Bridging switch 106 also communicates with adjunct processor (AP) 126 which extracts billing information from switch 106 over data connection 120. AP 126 processes the extracted billing information and sends it to billing system 140.

User contact database 149 communicates with manual telephone operator console 132 and with processors 142 and 144 and servers 134 and 146 and provides for customer contact information lookup, e.g., a phone number, to call back a caller who left a message to confirm that the message was successfully delivered.

Figure 4:
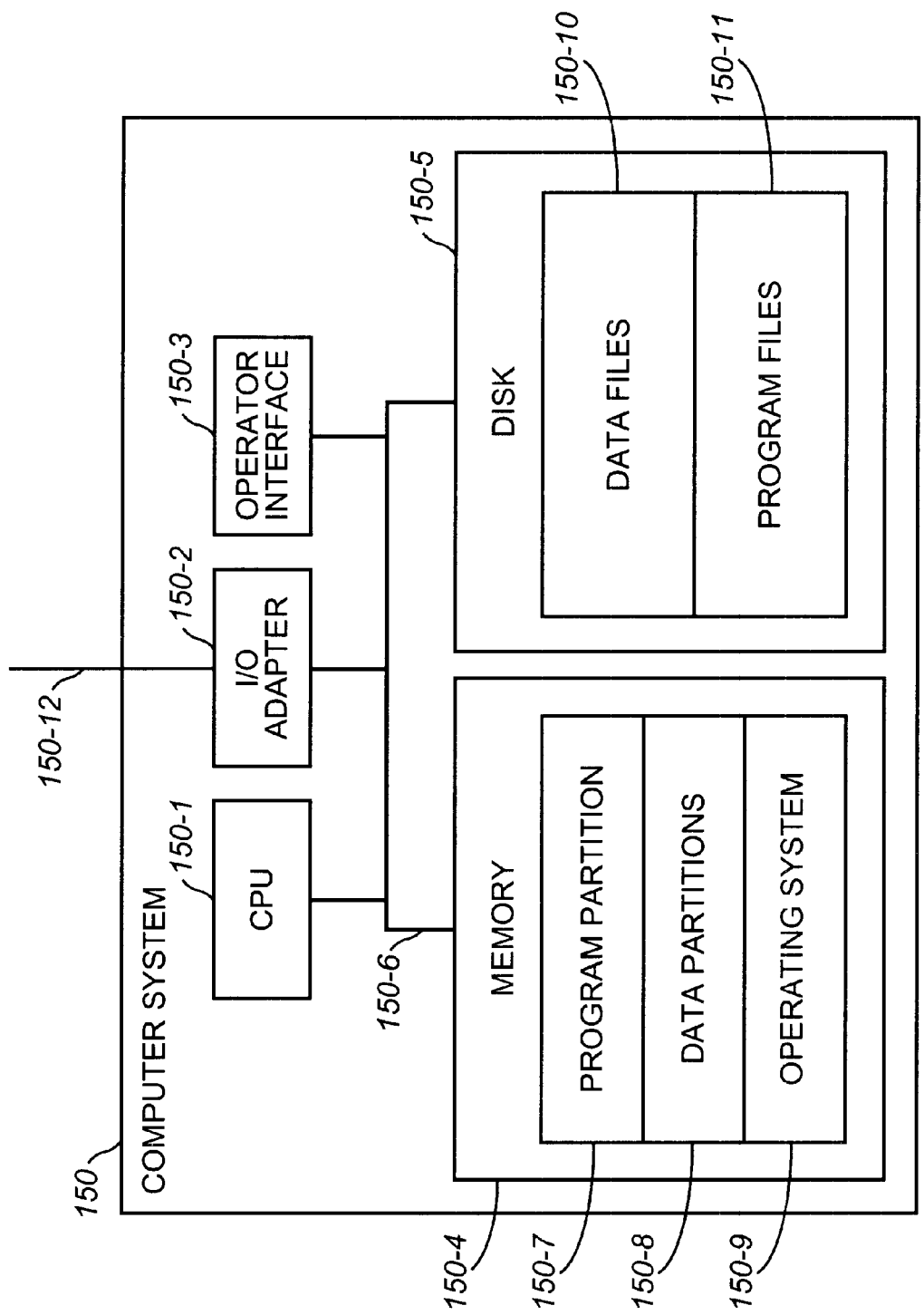
FIG. 4 is an exemplary block diagram of a computer system which is representative of any of an adjunct processor, ISN application processor, application call processor, message control processor, or billing system of FIG. 3.

FIG. 4 is an exemplary block diagram of a computer system 150 which is representative of adjunct processor 126, intelligent services network application processor 136, application call processor 142, message control processor 144 and billing system 140. Each of these blocks comprise at least one such computer system. Although only one each of adjunct processor 126, intelligent services network application processor 136, application call processor 142, message control processor 144 and billing system 140 are shown in FIG. 3, it is well known in the art that a distributed architecture in which more than one computer system performs each function is entirely equivalent. System 150 includes a CPU 150-1, for executing program instructions and processing data, memory 150-4, for storing program instructions executed by and data processed by CPU 150-1, disk storage 150-5, for storing data to be transferred to and from memory, and at least one I/O adapter 150-2, for communicating with other devices and transferring data in and out of the computer system over connection 150-12. System 150 may also include an operator interface 150-3, for providing status information to and accepting commands from a system operator. All these elements are interconnected by bus 150-6, which allows data to be intercommunicated between the elements. I/O adapter 150-2 represents one or more I/O adapters or network interfaces which may connect to local or wide area networks, such as, for example LWAN 138 or LAN 148 or directly to other components. Therefore, connection 150-12 represents a LAN or WAN or a direct connection to other equipment.

Memory 150-4 is accessible by CPU 150-1 over bus 150-6 and includes operating system 150-9, program partition 150-7 and data partition 150-8. Program partition 150-7 stores and allows execution by CPU 150-1 of program instructions which implement the functions of each respective system, AP 126, intelligent services network application processor 136, application call processor 142, message control processor 144 and billing system 140. Data partition 150-8 is accessible by CPU 150-1 and stores data used during the execution of program instructions. In adjunct processor 126, program partition 150-7 contains program instructions which implement extraction and processing of billing information from switch 106. In intelligent services network application processor 136, program partition 150-7 contains program instructions which selects an operator group, either manual telephone operator console 132 or automated audio response unit/audio server 134, to which calls are to be routed by automatic call distributor 124. In application call processor 142, program partition 150-7 contains program instructions which implement a collect calling service process 200, shown in FIG. 6, which controls standard collect calling service. In message control processor 144, program partition 150-7 contains program instructions which implement portions of collect calling service process 200, messaging process 300, and message delivery process 400, all shown in FIG. 6. In billing system 140, program partition 150-7 contains program instructions which implement processing of billing information.

Figure 5:
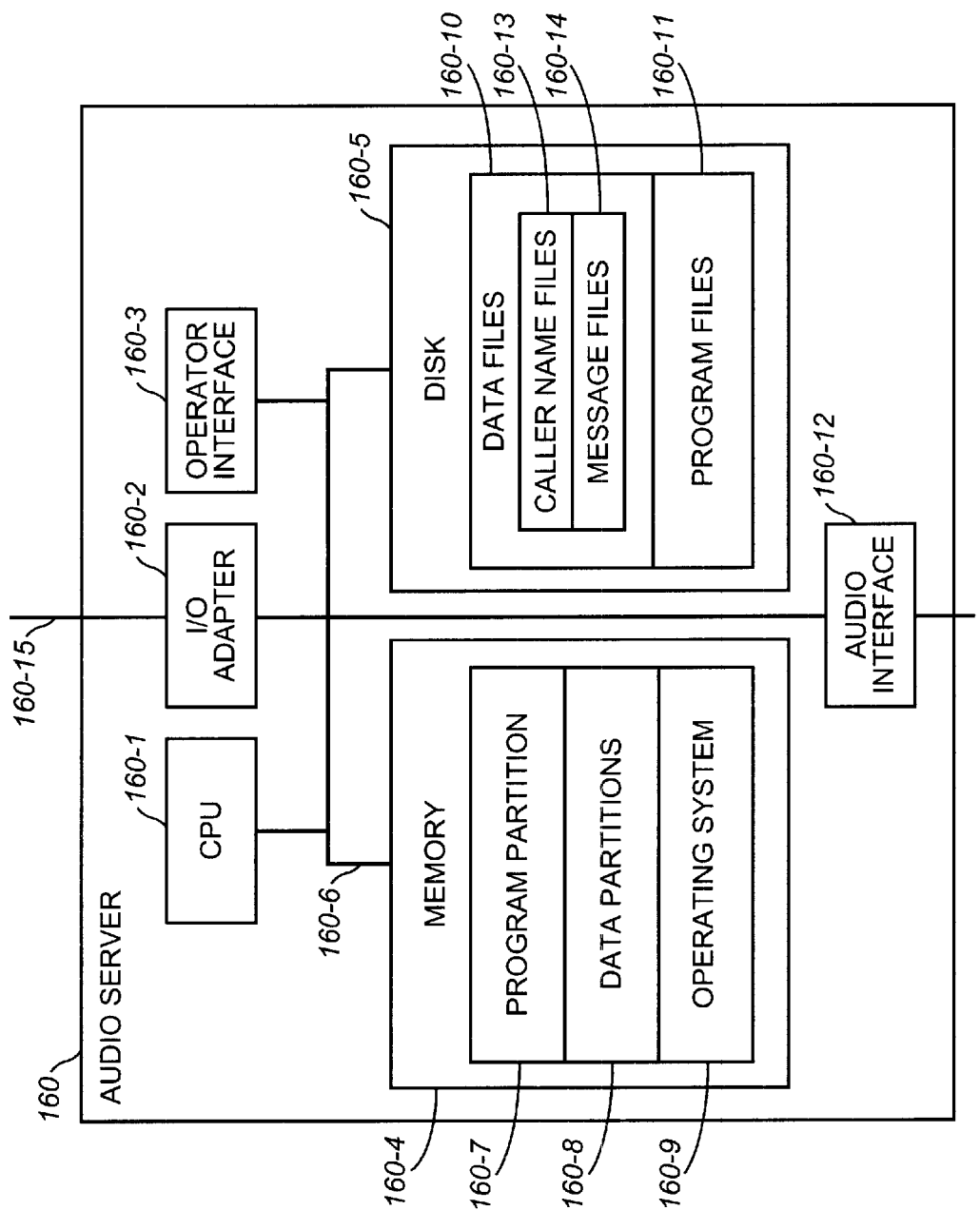
FIG. 5 is a block diagram of an audio server which is representative of any of an automated audio response unit or messaging platform audio server of FIG. 3.

FIG. 5 is an exemplary block diagram of an audio server 160 which is representative of automated audio response unit/audio server 134 and messaging platform audio server 146. Each of these blocks comprise at least one such audio server. Although only one each of automated audio response unit/audio server 134 and messaging platform audio server 146 are shown in FIG. 3, it is well known in the art that a distributed architecture in which more than one audio server performs each function is entirely equivalent. Audio server 160 includes a CPU 160-1, for executing program instructions and processing data, memory 160-4, for storing program instructions executed by and data processed by CPU 160-1, disk storage 160-5, for storing data to be transferred to and from memory, at least one I/O adapter 160-2, for communicating with other devices and transferring data in and out of the audio server over connection 160-15, and at least one audio interface 160-12, for communicating audio signals. Audio server 160 may also include an operator interface 160-3, for providing status information to and accepting commands from a server operator. All these elements are interconnected by bus 160-6, which allows data to be intercommunicated between the elements. I/O adapter 160-2 represents one or more I/O adapters or network interfaces which may connect to local or wide area networks, such as, for example LWAN 138 or LAN 148 or directly to other components. Therefore, connection 160-15 represents a LAN or WAN or a direct connection to other equipment.

Audio interface 160-12 interfaces audio server 160 to audio trunk lines, typically at least one T1 line. Each T1 line is capable of carrying 24 calls. Audio server 160 in one embodiment has the throughput necessary to handle 72 calls simultaneously, therefore, three T1 lines would be connected to each audio interface 160-12 in that embodiment.

Memory is accessible by CPU 160-1 over bus 160-6 and includes operating system 160-9, program partition 160-7 and data partition 160-8. Program partition 160-7 stores and allows execution by CPU 160-1 of program instructions which implement the functions of each respective system, automated audio response unit/audio server 134 and messaging platform audio server 146. Data partition 160-8 is accessible by CPU 160-1 and stores data used during the execution of program instructions. In automated audio response unit/audio server 134, program partition 160-7 contains program instructions which implement portions of processes 200, 300 and 400, as described below. In messaging platform audio server 146, program partition 160-7 contains program instructions which implement portions of processes 300 and 400, as described below.

Disk 160-5 contains data files 160-10. These files are used for voice message storage. Files 160-10 include caller name files 160-13 and message files 160-14. These files contain digital recordings of callers' names and voice messages respectively.

Figure 6:
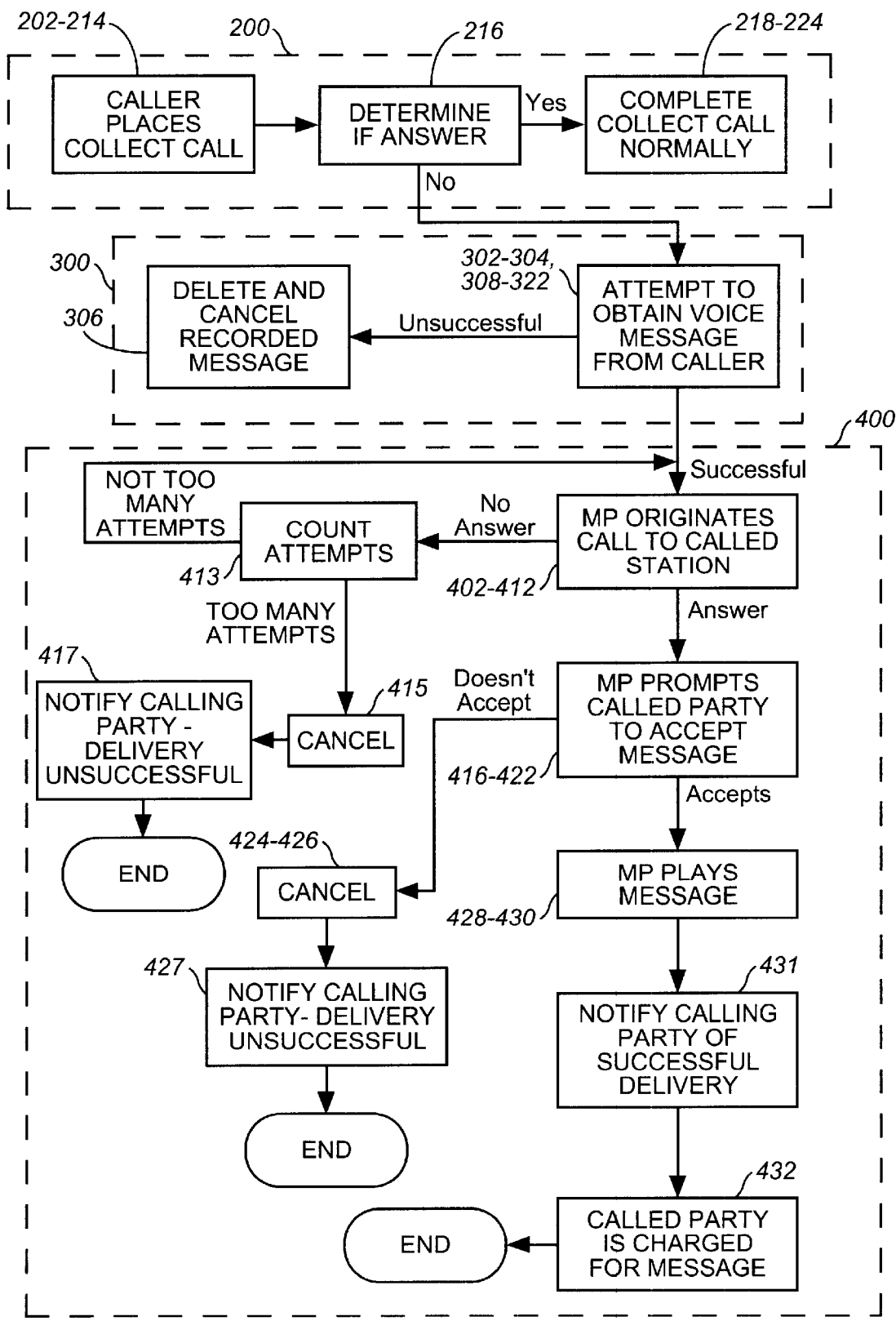
FIG. 6 is a overview flow diagram of the processes of the present invention implemented in the messaging platform.

FIG. 6 is an overview flow diagram of the processes implemented in messaging platform 100, showing the interaction of collect calling service process 200, messaging process 300 and message delivery process 400. Process 200 includes steps 202–214, in which a caller places a collect call, messaging platform 100 collects the necessary information and the call is connected to the called station. In step 216, messaging platform 100 determines whether the called station is answered. If so, process 200 then completes the collect call normally in steps 218–224. If the called station does not answer or is busy, messaging process 300 is invoked. Process 300 includes steps 302–304 and 308–322, in which messaging platform 100 attempts to obtain a recorded voice name, if necessary, and a recorded message from the caller. If this attempt is unsuccessful, the process goes to step 306, in which the messaging call is canceled, with the appropriate treatment. If the attempt is successful, message delivery process 400 is invoked. Process 400 includes steps 402–412, in which messaging platform 100 originates a call to the called station in an attempt to deliver the message. If there is no answer, or the terminating number is busy, the process goes to step 413, in which messaging platform 100 examines the number of delivery attempts which have been made. If there have been too many delivery attempts, the process goes to step 415, in which the message delivery is canceled, and, in one embodiment, the calling party is informed of the unsuccessful delivery in step 417. Step 417 is omitted in another embodiment. If there have not been too many delivery attempts, the process loops back to step 402. If, in step 412, the call is answered, the process goes to steps 416–422, in which messaging platform 100 identifies the caller by playing back the recorded name file and prompts the called party to accept the message. If the called party does not accept the message, the process goes to steps 424–426, in which the message is canceled, with the appropriate treatment and, in one embodiment, the calling party is informed of the unsuccessful delivery in step 427. Step 427 is omitted in another embodiment. If the called party accepts the message, the process goes to step 428–430, in which messaging platform 100 plays the message to the called party. In step 431, the calling party is notified that the message was successfully delivered. In step 432, the called party is charged for the message delivery. The order of the various steps could be varied in alternative embodiments. For example, step 432 takes place before step 431 in one alternative embodiment.

Figure 7:
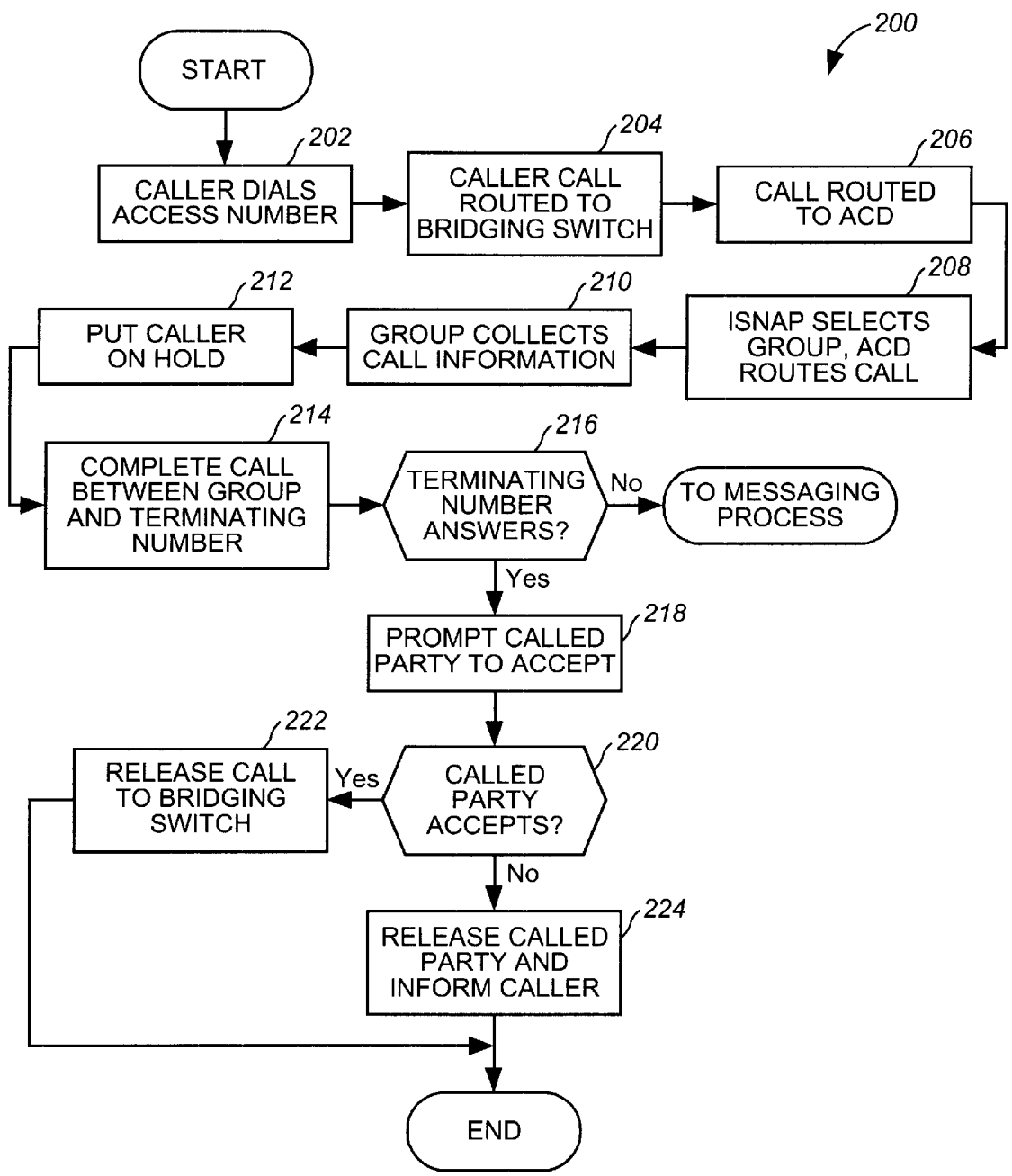
FIG. 7 is a flow diagram of a collect calling service process of FIG. 6.

FIG. 7 is a flow diagram of collect calling service process 200, implemented by system 100 in conjunction with network 102, as shown in FIG. 3, in another embodiment. Process 200 begins with step 202, in which a caller dials the access number for collect calling service. For example, the caller may dial an "800" access number or the caller may dial "0+terminating number". In step 204, network 102 recognizes the access number and routes the call to bridging switch 106. In step 206, bridging switch 106 routes the call to automatic call distributor 124. In step 208, automatic call distributor 124 sends the signaling information, including the terminating number, associated with the call to intelligent services network application processor 136, which selects an operator group, either manual telephone operator console 132 or automated audio response unit/audio server 134, to which the call is to be routed. Intelligent services network application processor 136 sends the routing command to automatic call distributor 124, which then routes the call accordingly. In step 210, a member of the operator group to which the call was routed collects the information needed to complete collect calling service. This information includes the terminating number, if an "800" access number was dialed and always includes the caller's name. If the operator group is automated audio response unit/audio server 134, the caller's name is recorded. In step 212, the caller is put on hold while the call is completed. In step 214, the call is completed between the operator group and the terminating number, allowing messaging system 100 to monitor the call. In step 216, system 100 determines whether the terminating number answered the call. If the terminating number did not answer the call, either due to ring-no-answer or due to a busy signal, system 100 invokes messaging process 300. If the terminating number does answer, the process goes to step 218, in which the operator group prompts the called party to accept the collect call. In step 220, it is determined whether the called party accepts the collect call. If the called party accepts the call, the process goes to step 222, in which the bridging switch connects the caller to the called party and releases the connection to the operator group. The process then ends. If the called party does not accept the call, the process goes to step 224, in which the operator group releases the called party and informs the caller of the refusal of the call. The process then ends.

Figure 8:
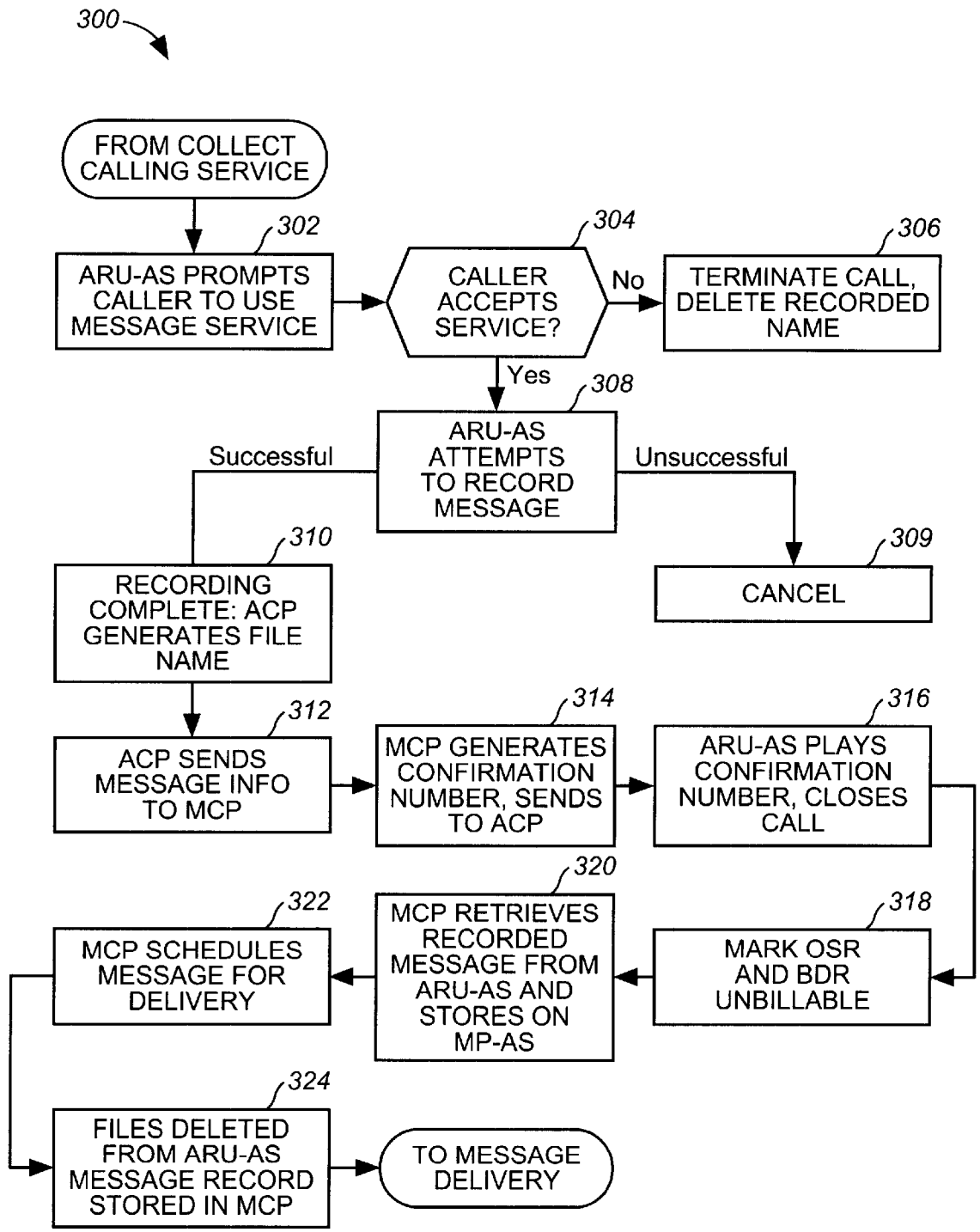
FIG. 8 is a flow diagram of a messaging process of FIG. 6.

FIG. 8 is a flow diagram of messaging process 300, implemented by system 100 in conjunction with network 102 shown in FIG. 3, in accordance with the present invention. Process 300 begins with step 302, in which the call is connected to automated audio response unit/audio server 134, which prompts the caller to use the messaging service. In step 304, it is determined whether the caller accepts messaging service. If not, the process goes to step 306, in which the call is terminated and the caller's name, if it was recorded in step 210 of FIG. 7, is deleted. If the caller accepts messaging service, the process continues with step 308, in which automated audio response unit/audio server 134 attempts to record the message, and if necessary, the caller's name. If the attempt to record the message is unsuccessful, the process goes to step 309, in which the process is canceled. If the attempt to record the message is successful, the process goes to step 310, in which application call processor 142 generates file names that identify the recorded name and message. In step 312, application call processor 142 informs message control processor 144 that the message has been recorded by sending a message information record to message control processor 144. The message information record includes the called number, other call attributes such as, for example, a coupon or promotional offer number, the address of the automated audio response unit/audio server that recorded the name and message (in one embodiment, there are several automated audio response unit/audio servers), the file names identifying the caller's name and voice message files on automated audio response unit/audio server 134, and an access number to use for message delivery. In response to this message, in step 314, message control processor 144 generates a confirmation number with which the caller can manually obtain the delivery status of the message and sends the confirmation number to message control processor 144. In step 316, application call processor 142 commands automated audio response unit/audio server 134 to first play a closing message to the caller, including the confirmation number, then to terminate the call. In step 318, bridging switch 106 generates billing information in the form of an operator service record (OSR) and sends it via AP 126 to billing system 140. Likewise, application call processor 142 generates billing information in the form of a billing detail record (BDR) which is sent to billing system 140. Both the OSR and the BDR are marked as unbillable, thus indicating that no one is to be charged for the call during which the message was recorded.

In step 320, message control processor 144 retrieves the recorded voice message and name files from automated audio response unit/audio server 134 using the information in the message information record and stores the voice message and name locally on messaging platform audio server 146. In step 322, message control processor 144 schedules the message for delivery. In step 324, the caller's name and voice message files are deleted from automated audio response unit/audio server 134 and the message information record is stored in message control processor 144.

Figure 9:
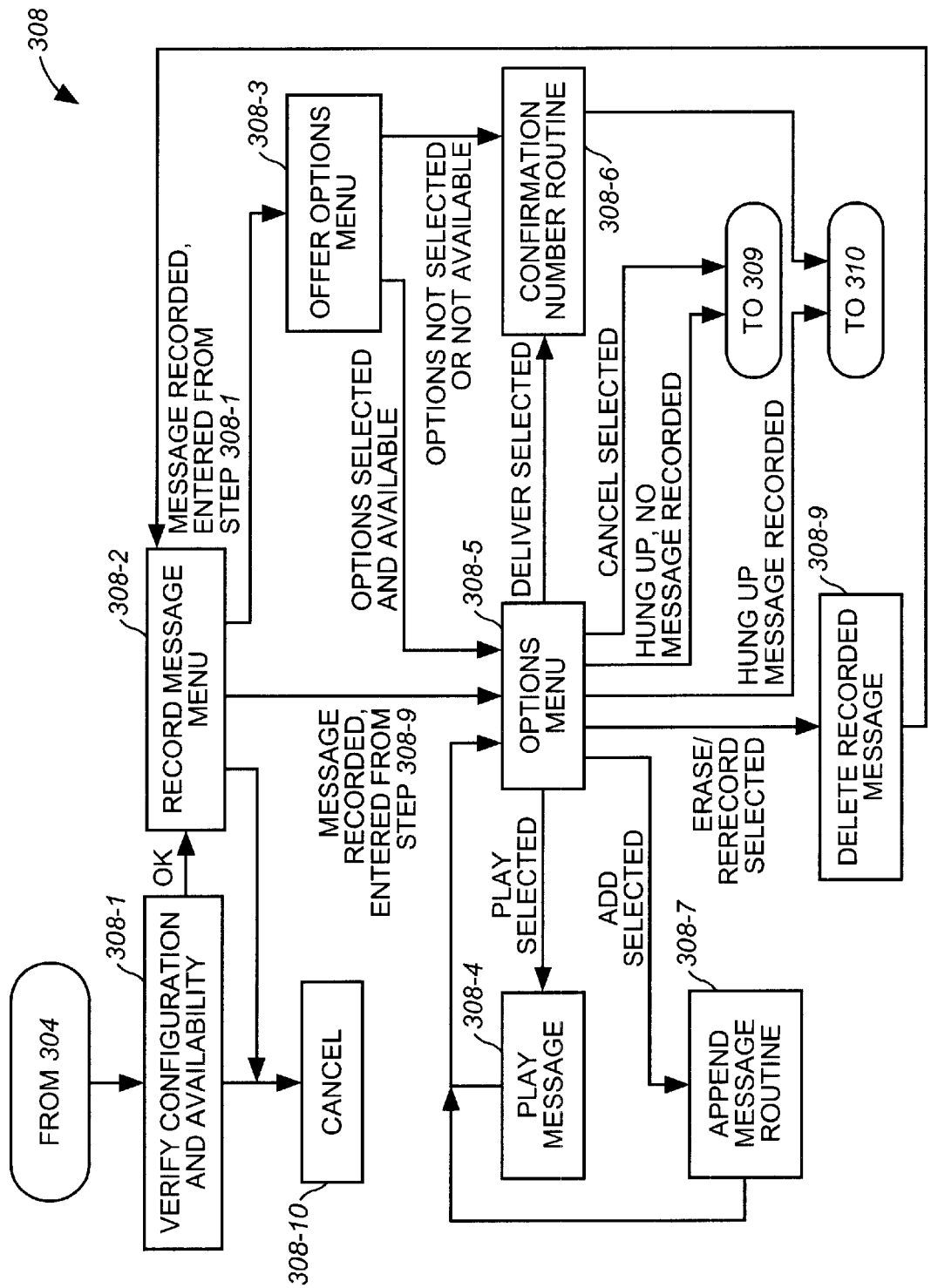
FIG. 9 is a flow diagram of a subprocess of step 308 of FIG. 8.

FIG. 9 is a flow diagram of a subprocess of step 308 of messaging process 300 of FIG. 8. Subprocess 308 is entered from step 304 of FIG. 8 and begins with step 308-1, in which the configuration and availability of the messaging platform are verified. If the necessary subsystems of the messaging platform are not properly configured or are unavailable, the messaging process goes to step 308-10, in which the message is canceled. If the messaging platform is properly configured and is available, the process goes to step 308-2, in which the record message menu is performed. This menu allows the caller to record a voice message and, if necessary, a name. If a message is not properly recorded by the record message menu, the messaging process goes to step 308-10, in which the message is canceled. If a message is properly recorded and the record message menu was entered from step 308-1, the process continues with step 308-3. If a message is properly recorded and the record message menu was entered from step 308-9, the process goes to step 308-5.

In step 308-3, the offer options menu is performed. This menu allows the caller to select whether or not to enter options. If option entry is not selected, the process goes to step 308-6. If option entry is selected, the process goes to step 308-5.

In step 308-5, the options menu is performed. This menu allows the caller to select whether to perform several optional functions. These functions include: playing the message back to the caller, delivering the message, adding to the message, erasing and rerecording the message and canceling the message. If the play option is selected, the process goes to step 308-4, in which the message is played back to the caller. The process then returns to the options menu, step 308-5. If the add option is selected, the process goes to step 308-7, in which the append message routine is performed. The process then returns to the options menu, step 308-5. If the erase/rerecord option is selected, the process goes to step 308-9, in which the recorded message is deleted. The process then goes to step 308-2, in which the record message menu is again performed. If the cancel option is selected, the process goes to step 309, in which the message is deleted and canceled. If the deliver option is selected, the process goes to step 308-6. If the caller has hung up, the process goes to step 309, if no valid message has been recorded, and to step 310, if a valid message has been recorded.

In step 308-6, the confirmation number routine is performed. This routine supplies the caller with a confirmation number which may be used later to verify the delivery status of the message. In an alternative embodiment, instead of a confirmation number or in addition to a confirmation number, a message is provided indicating that delivery will be attempted and that the caller will be notified if delivery is successful or cancelled.

Figure 10:
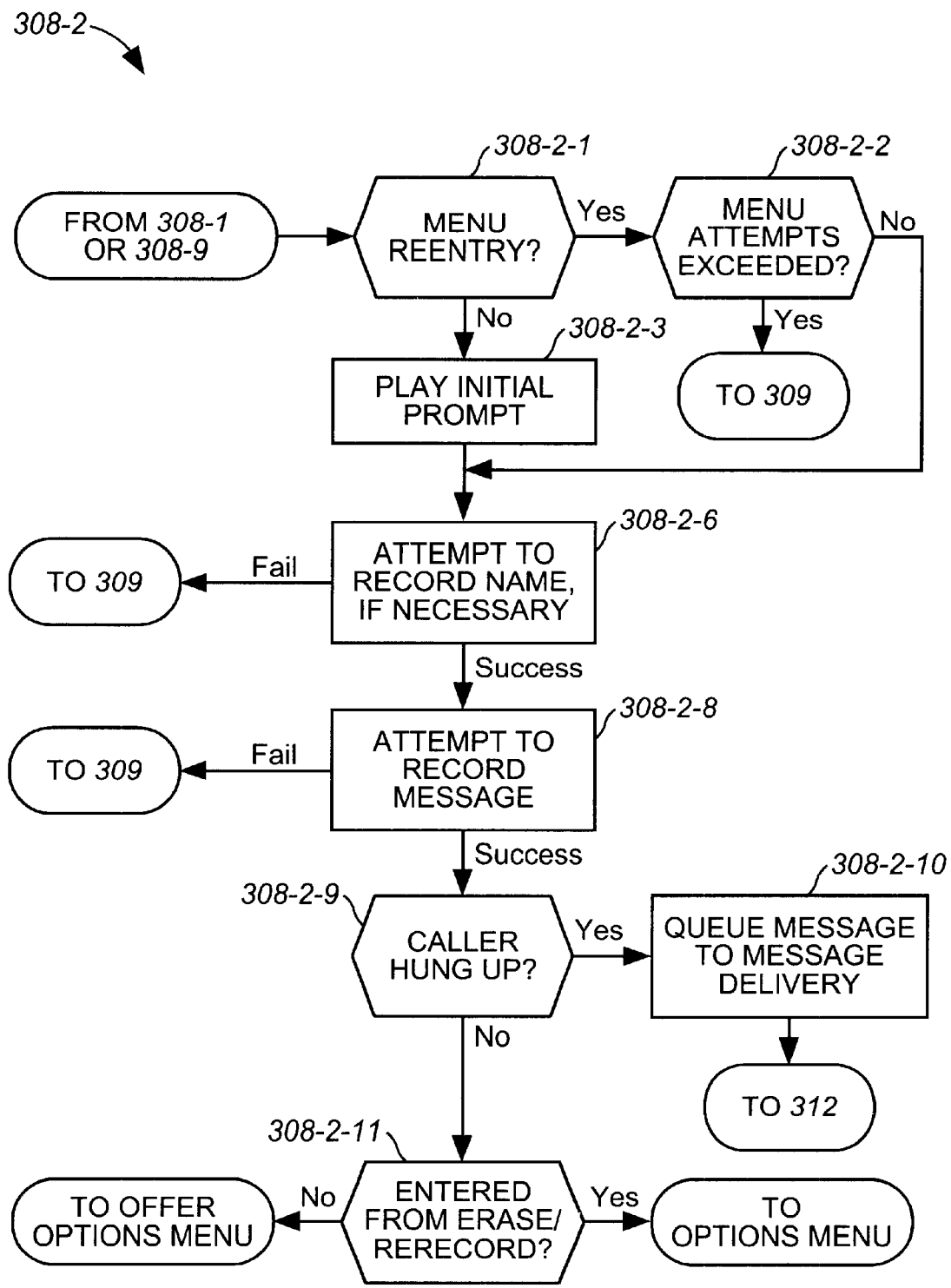
FIG. 10 is a flow diagram of a record message menu subprocess of FIG. 9.

FIG. 10 is a flow diagram of a record message menu subprocess of step 308-2 of FIG. 9. Record message menu 308-2 is entered from either step 3081 or step 308-9. In either case, menu 308-2 begins with step 308-2-1, in which it is determined whether menu 308-2 is being reentered from step 308-9 or is being entered for the first time from step 308-1. If menu 308-2 is not being reentered, the process goes to step 308-2-3. If menu 308-2 is being reentered, the process goes to step 308-2-2, in which it is determined whether the maximum allowed number of menu attempts has been exceeded. If the allowed menu attempts have been exceeded, the process goes to step 309, in which the process is canceled. If the allowed menu attempts have not been exceeded, the process goes to step 308-2-6.

In step 308-2-3, the initial prompt to the caller is played. In step 308-2-6, the process verifies whether the caller's name was recorded in step 210. If not, the process attempts to record the caller's name. If, after the allowed number of attempts, the caller's name has not been successfully recorded, step 308-2-6 fails and the process goes to step 309, in which the process is canceled. If the caller's name has been successfully recorded, the process goes to step 308-2-8, in which the process attempts to record the caller's message. If, after the allowed number of attempts, the caller's message has not been successfully recorded, step 308-2-8 fails and the process goes to step 309, in which the process is canceled. If the caller's message has been successfully recorded, the process goes to step 308-2-9, in which it is determined whether the caller has hung up. If the caller has hung up, the process goes to step 308-2-10, in which the message is queued to message delivery routine 400. The process then prepares for message delivery routine 400, beginning at step 310 of FIG. 8. If the caller has not hung up, the process goes to step 308-2-11, in which it is determined whether menu 308-2 was entered from Erase/Rerecord routine 308-9. If menu 308-2 was entered from Erase/Rerecord routine 308-9, the process goes to options menu 308-5 of FIG. 9. If menu 308-2 was entered from step 308-1, the process goes to offer options menu 308-3 of FIG. 9.

Figure 11:
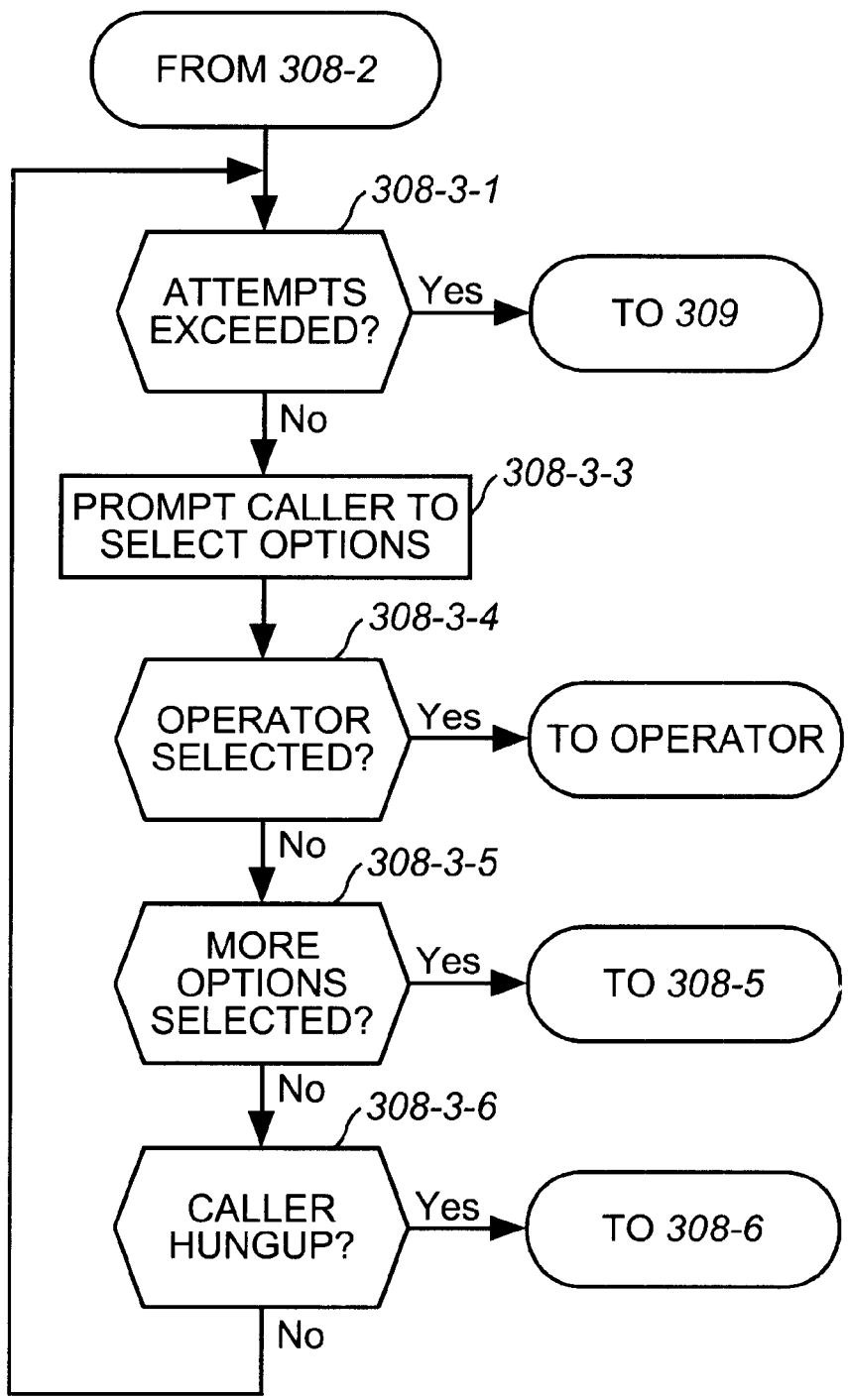
FIG. 11 is a flow diagram of an offer options menu subprocess of FIG. 9.

FIG. 11 is a flow diagram of an offer options menu subprocess of step 308-3 of FIG. 9. Menu 308-3 is entered from step 308-2. Menu 308-3 begins with step 308-3-1 in which it is determined whether the allowable number of attempts has been exceeded. If so, the process goes to step 309, in which the process is canceled. If not, the process goes to step 308-3-3, in which the caller is prompted to select more options. In step 308-3-4, it is determined whether the caller selected connection to an operator. If so, the caller is connected to an operator. If not, the process goes to step 308-3-5, in which it is determined whether the caller selected more options. If so, the process goes to step 308-5, the options menu. If not, the process loops back to step 308-3-1.

Figure 12:
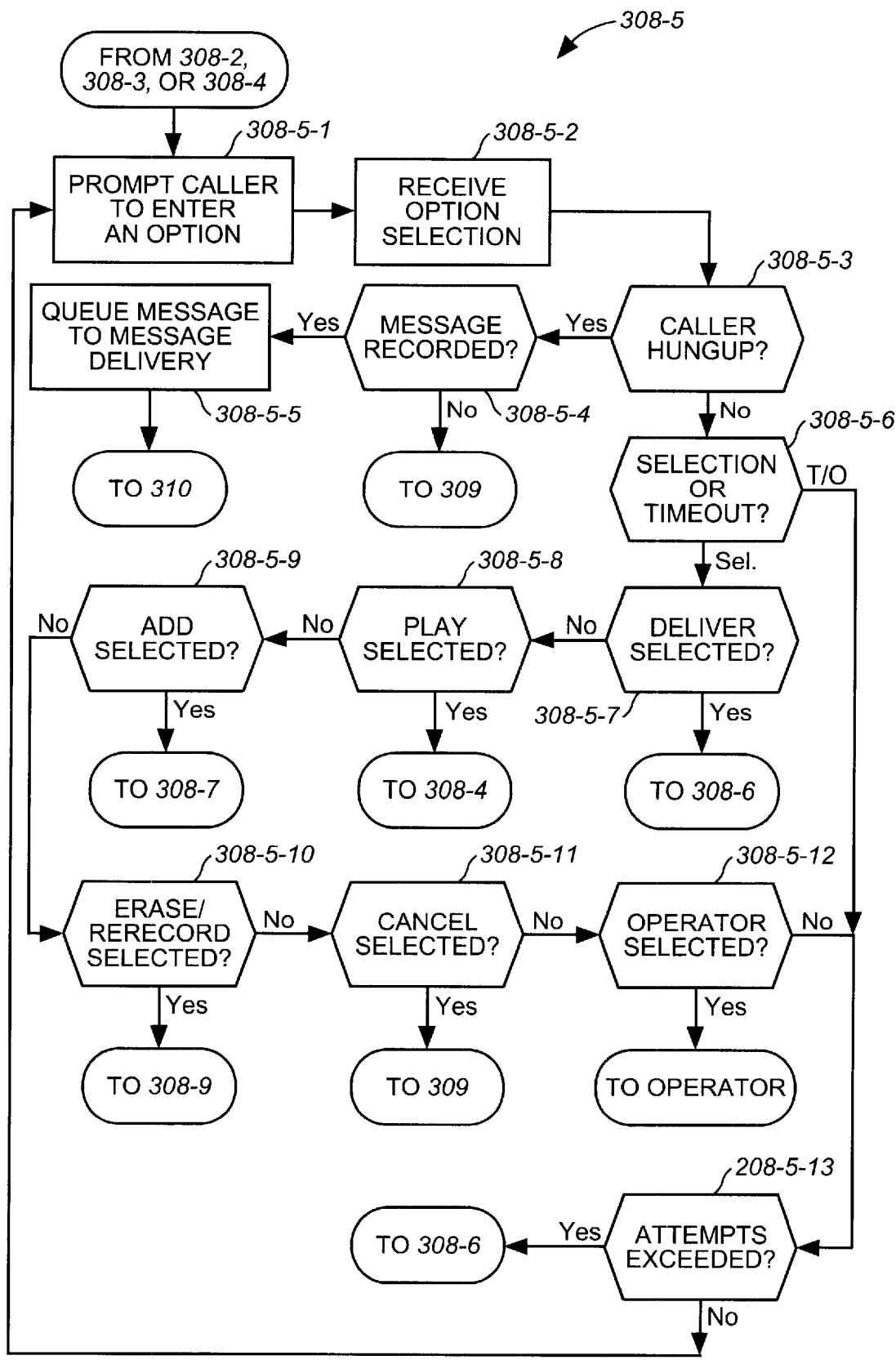
FIG. 12 is a flow diagram of an options menu subprocess of FIG. 9.

FIG. 12 is a flow diagram of an options menu subprocess of step 308-5 of FIG. 9. Menu 308-5 is entered from either step 308-2, step 308-3, or step 308-4 of FIG. 9. Menu 308-5 begins with step 308-5-1 in which the caller is prompted to enter an option. In step 308-5-2, the process receives the option selection entered by the caller. In step 308-5-3, it is determined whether or not the caller has hung up. If the caller has not hung up, the process goes to step 308-5-6. If the caller has hung up, the process goes to step 308-5-4, in which it is determined whether or not a message was recorded. If no message was recorded, the process goes to step 309, in which the process is canceled. If a message was recorded, the process goes to step 308-5-5, in which the message is queued to message delivery routine 400. The process then prepares for message delivery routine 400, beginning at step 310 of FIG. 8.

In step 308-5-6, it is determined whether the caller has entered a selection or timed out without entering a selection. If the caller has timed out, the process goes to step 308-5-13. If the caller has entered a selection, the process goes to step 308-5-7, in which it is determined whether the deliver message option was selected. If so, the process goes to step 308-6, the confirmation number routine. If not, the process goes to step 308-5-8, in which it is determined whether the play message option was selected. If so, the process goes to step 308-4, in which the message is played. If not, the process goes to step 308-5-9, in which it is determined whether the add to message option was selected. If so, the process goes to step 308-7, the append message routine. If not, the process goes to step 308-5-10, in which it is determined whether the erase/rerecord option was selected. If so, the process goes to step 308-9, in which the recorded message is deleted. If not, the process goes to step 308-5-11, in which it is determined whether cancel was selected. If so, the process goes to step 309, in which the message is canceled. If not, the process goes to step 308-5-12, in which it is determined whether the connect to an operator option was selected. If so, the caller is connected to an operator. If not, all valid selections have been checked, so the selection entered by the caller is invalid and the process goes to step 308-5-13.

In step 308-5-13, it is determined whether the maximum allowed number of option selection attempts have been exceeded. If so, the process goes to step 308-6, the confirmation number routine. If not, the process goes to step 308-5-1 and the option menu is repeated.

Figure 13:
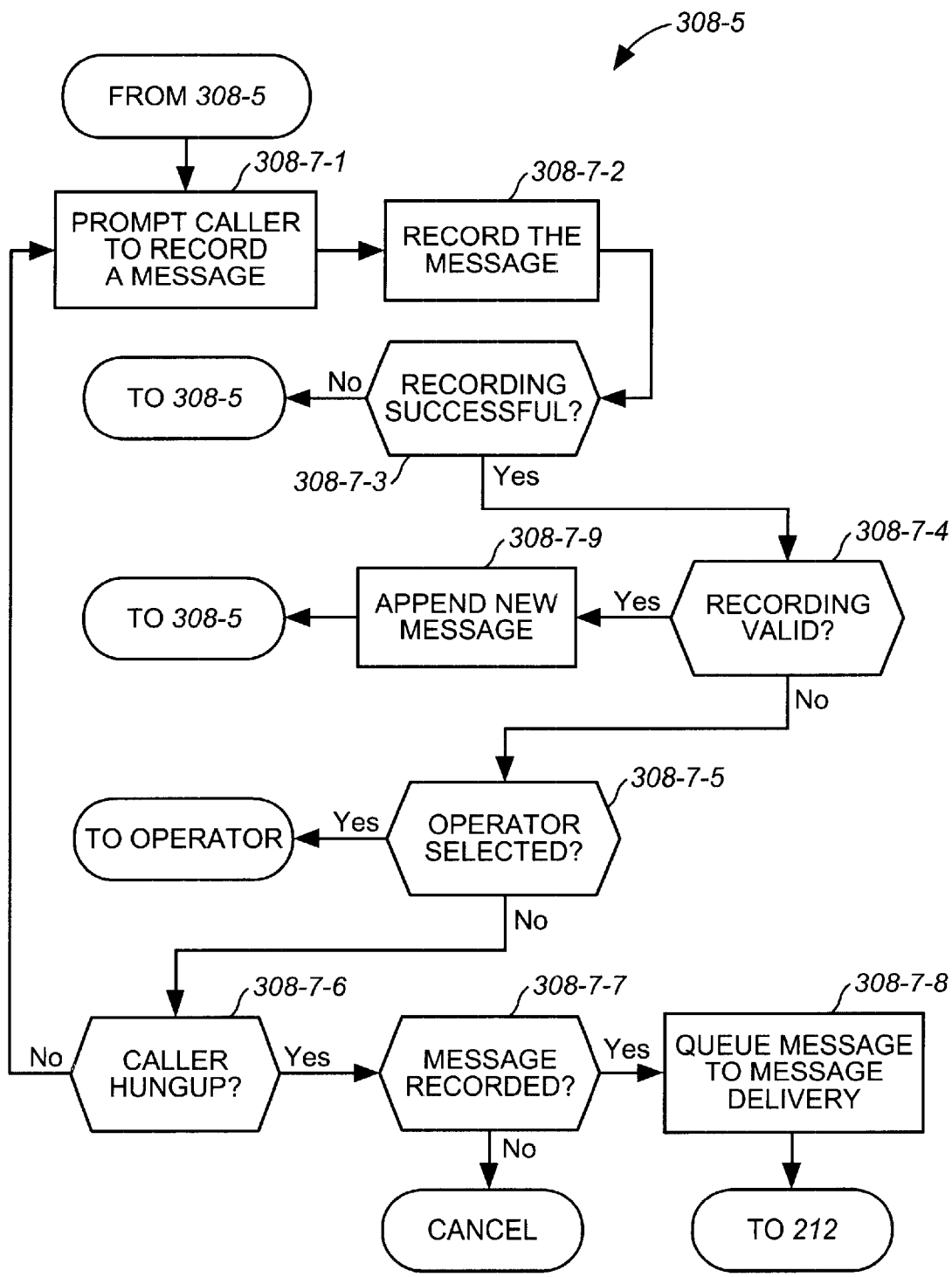
FIG. 13 is a flow diagram of an append message subprocess of FIG. 9.

FIG. 13 is a flow diagram of an append message subprocess of step 308-7 of FIG. 9. Process 308-7 is entered from step 308-5 of FIG. 9. Process 308-7 begins with step 308-7-1, in which the caller is prompted to record an additional message. In step 308-7-2, the caller records the additional message. In step 308-7-3, it is determined whether recording of the additional message was successful. If not, the process goes to step 308-5, the options menu. If so, the process goes to step 308-7-4 in which it is determined whether recording of the additional message is valid. If the recording is valid, the process goes to step 308-7-9, in which the newly recorded message is appended to the original message. The process then goes to step 308-5, the options menu. If not, the process goes to step 308-7-5, in which it is determined whether the caller selected to be connected to an operator. If so, the caller is connected to an operator. If not, the process goes to step 308-7-6, in which it is determined whether the caller has hung up. If not, the process goes to step 308-7-1 and the append message routine is repeated. If so, the process goes to step 308-7-7, in which it is determined whether the caller recorded a valid original message. If not, the process is canceled. If so, the process goes to step 308-7-8, in which the message is queued to message delivery routine 400. The process then prepares for message delivery routine 400, beginning at step 310 of FIG. 8.

Figure 14:
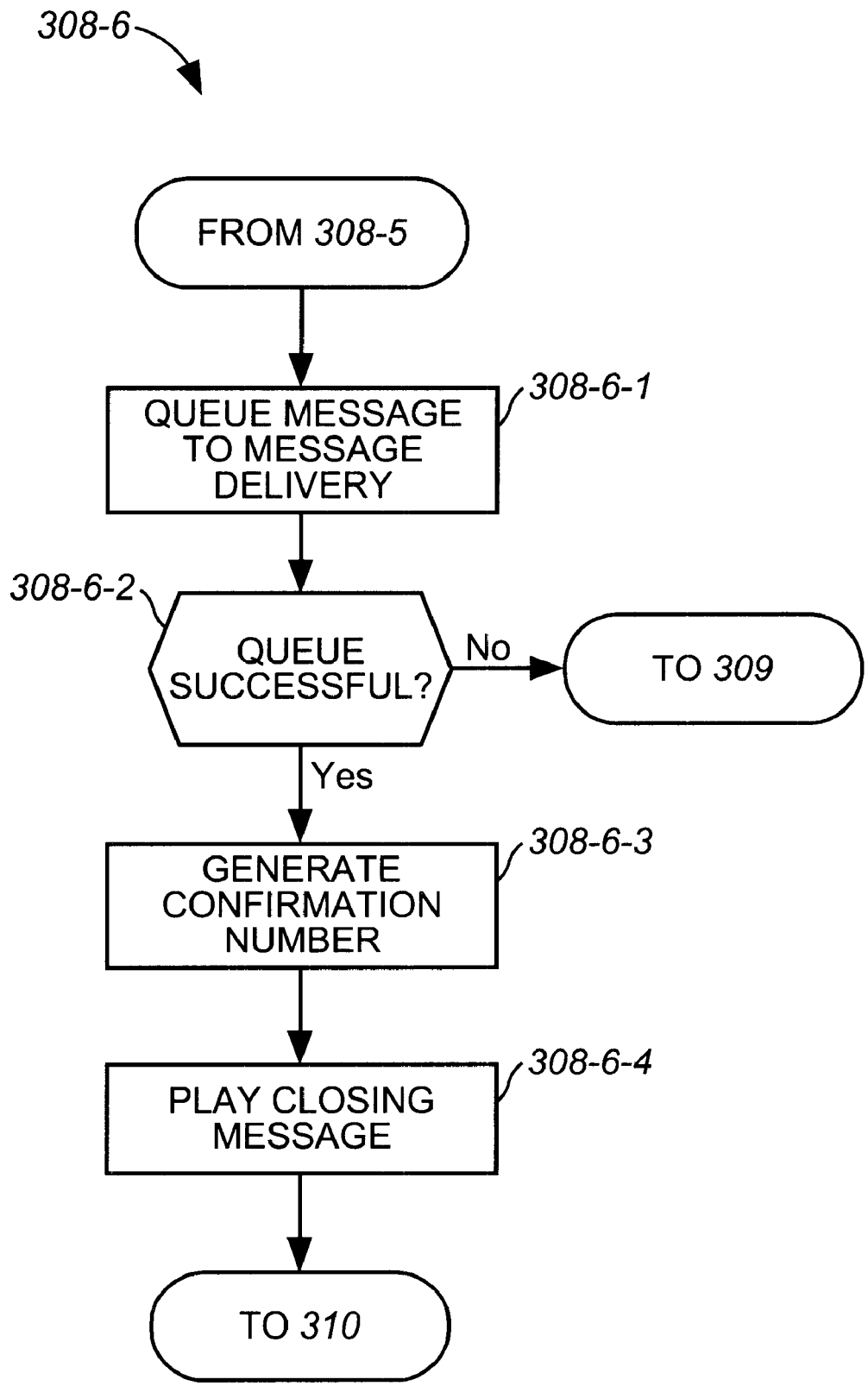
FIG. 14 is a flow diagram of a confirmation number subprocess of FIG. 9.

FIG. 14 is a flow diagram of a confirmation number subprocess of step 308-6 of FIG. 9. Process 308-6 is entered from step 308-5 of FIG. 9. Process 308-6 begins with step 308-6-1, in which a recorded message is queued to message delivery routine 400. In step 308-6-2, it is determined whether the queue was successful. If not, the process goes to step 309, in which the message is canceled. If so, the process goes to step 308-6-3, in which a confirmation number is generated. In step 308-6-4, a closing informational message, including the confirmation message, is played to the caller. The process then prepares for message delivery routine 400, beginning at step 310 of FIG. 8.

Figure 15:
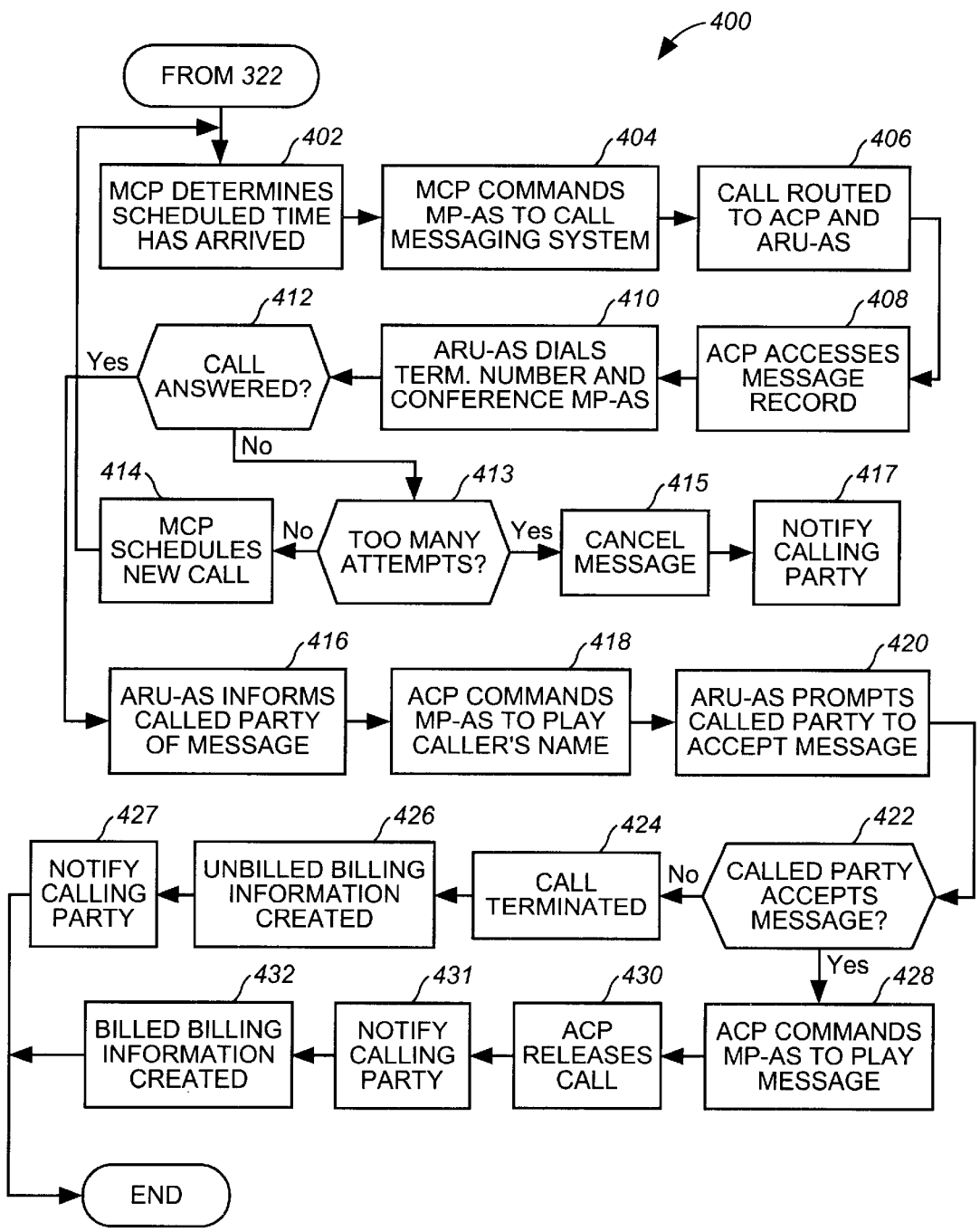
FIG. 15 is a flow diagram of a message delivery process of FIG. 6.

FIG. 15 is a flow diagram of message delivery process 400, implemented in system 100 in conjunction with network 102, in accordance with the present invention. Process 400 begins with step 402, in which message control processor 144 determines that the time scheduled in step 320 of FIG. 8 for delivery of a message has arrived. In step 404, message control processor 144 transmits a command to messaging platform audio server 146 which causes messaging platform audio server 146 to originate a call to the messaging system 100 through bridging switch 106. The command includes a key to the message information record stored on message control processor 144 that contains the message file reference number and the caller name file reference number that identify the message to be delivered. The messaging platform audio server originates the call using a special access number that causes the desired routing to occur. The automatic number identification (ANI) message associated with the call contains the key to the message information record stored in message control processor 144. In step 406, the audio portion of the call from messaging platform audio server 146 is connected and routed to automated audio response unit/audio server 134. The data portion of the call including the ANI is extracted by automatic call distributor 124 and sent to application call processor 142 via intelligent services network application processor 136.

In step 408, application call processor 142 uses the key contained in the ANI message to access the message information record stored in message control processor 144. In step 410, application call processor 142 transmits a command to automated audio response unit/audio server 134 which causes automated audio response unit/audio server to originate a call to the terminating number and connect the call from messaging platform audio server 146 to the newly originated call in a conference call. In step 412, application call processor 142 determines whether the call to the terminating number was answered or whether there was ring-no-answer (RNA) or busy. If there was RNA or busy, the process continues with step 414 in which message control processor 144 schedules another message delivery attempt call for a later time. The process then loops to step 402. If the terminating number answers the call, the process continues with step 416, in which application call processor 142 commands automated audio response unit/audio server 134 to play a prompt which informs the called party of the message. In step 418, application call processor 142 transmits a command to message control processor 144 which in turn commands messaging platform audio server 146 to play the caller's recorded name, which identifies the originator of the message to the called party. In step 420, application call processor 142 commands automated audio response unit/audio server 134 to prompt the called party to accept the message. In step 422, application call processor 142 determines whether the called party accepts the message. If the called party does not accept the message, the process continues with step 424, in which the call is terminated and step 426, in which unbilled billing information is created. This billing information causes billing system 140 to bill no one for the call. In one embodiment, the calling party is informed of an unsuccessful delivery attempt in step 427. Step 427 is omitted in another embodiment. The process then ends.

If the called party accepts the message, the process continues with step 428, in which application call processor 142 commands message control processor 144 which in turn commands messaging platform audio server 146 to play the message to the called party. In step 430, application call processor 142 commands automatic call distributor 124, via intelligent services network application processor 136, to release the call while messaging platform audio server 146 plays the message. In step 431, the calling party is called and notified of the successful delivery of the message. In step 432, billed billing information is created. This billing information causes billing system 140 to bill the call to the called party. The process then ends.

In one embodiment, the calling party is informed of an unsuccessful delivery attempt in step 417, if there were too many attempts in step 413 and the message was cancelled in step 415. Step 417 is omitted in another embodiment. The order of the steps can be varied, as previously mentioned. For example, step 427 takes place before step 426 in one alternative embodiment. Similarly, step 431 takes place after step 432 in one alternative embodiment.

Figure 16:
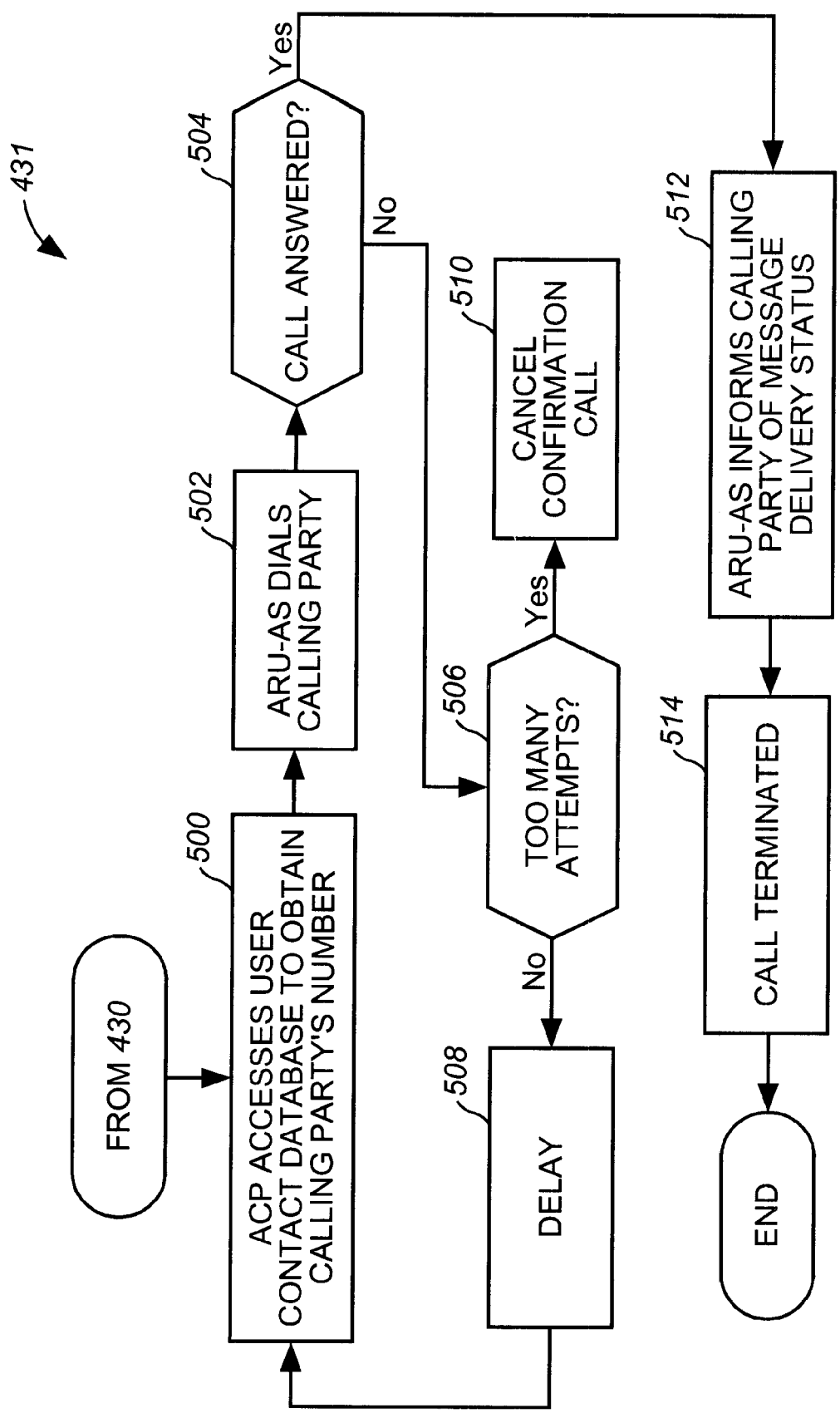
FIG. 16 is a flow diagram of a message delivery confirmation process of FIG. 15.

FIG. 16 shows step 431 in greater detail, in accordance with one embodiment. In step 500, application call processor 142 uses the user contact database 149 to look up the phone number of the calling party. In one embodiment, the user contact database 149 captures calling party phone number from ANI information. The calling party is allowed to provide their phone number to the user contact database 149 in another embodiment, either during the call when they leave their message for the called party, or during a separate call. In FIGS. 3–16, the user is called to confirm successful message delivery; in an alternative embodiment, other methods of communication are possible, such as e-mail, pager, etc., in which case the user contact database 149 contains both the contact number and the method of contact for providing the confirmation message. In step 502, application call processor 142 transmits a command to automated audio response unit/audio server 134 which causes automated audio response unit/audio server to originate a call to the calling party at the contact number obtained from the user contact database 149. In step 504, application call processor 142 determines whether the call to the terminating number was answered or whether there was ring-no-answer (RNA) or busy. If there was RNA or busy, the process continues with step 508 in which a delay is imposed before the confirmation callback is retried. The process then loops back to step 500. If the calling party answers the call, the process continues with step 512, in which application call processor 142 commands automated audio response unit/audio server 134 to play a message which informs the calling party of the status of the delivery of the message; e.g., that the message was successfully delivered.

Steps 417 and 427 would be performed in a similar manner except that in step 512 the calling party would be informed that the message was not successfully delivered.

The protection sought is not to be limited to the disclosed embodiments, which are given by way of example only, but instead is to be limited only by the scope of the appended claims as properly interpreted in accordance with the doctrine of equivalents.

What is claimed is:

1. A method of delivering a message from a calling party at a calling station to a called party at a called station, the method comprising:

in response to an unsuccessful attempt to communicate from the calling station to the called station, storing a message from the calling station, using a messaging system, for later delivery to the called station;

obtaining address information for the calling party, from a user contact database configured to store a plurality of addresses for the calling party and a communication technique associated with each of the plurality of addresses, said user contact database being further configured to store periods of time when said each of the plurality of addresses can contact the calling party, and obtaining address information for the called station, from the calling station;

attempting to deliver the message, using the messaging system, to the called station by initiating a communication from the messaging system to the called station using the address information for the called station that was obtained from the calling station;

determining, using the messaging system, whether the message delivery attempt was successful; and in response to successful delivery of the message, attempting to notify the calling party that the message to the called station was successfully delivered, said notification attempt being sent to at least one of the plurality of addresses of the calling party based on the time the notification attempt was sent.

2. A method in accordance with claim 1 wherein attempting to notify the calling party that the message was successfully delivered comprises sending an e-mail message.

3. A method in accordance with claim 1 wherein attempting to notify the calling party that the message to the called party was successfully delivered comprises sending a page to a pager.

4. A method in accordance with claim 1 wherein attempting to notify the calling party that the message to the called party was successfully delivered comprises initiating a phone call to the calling party.

5. A method in accordance with claim 1 wherein attempting to notify the calling party that the message was successfully delivered comprises initiating a phone call to the calling party using voice over IP.

6. A method in accordance with claim 1 wherein attempting to notify the calling party that the message was successfully delivered comprises initiating a call and playing a voice message to the calling party.

7. A method in accordance with claim 1 wherein attempting to notify the calling party that the message was successfully delivered comprises attempting to send a code identifying the delivered message to the calling party.

8. A method in accordance with claim 1 and further comprising, in response to cancellation of delivery of the message, attempting to notify the calling party that the message to the called station was not successfully delivered.

9. A system for delivering a message from a calling party at a calling station to a called party at a called station, the system comprising:
  a voice message system configured to store a message from the calling station, for later delivery to the called station, in response to an unsuccessful attempt to communicate from the calling station to the called station;
  a user contact database configured to store a plurality of addresses for the calling party and a communication technique associated with each of the plurality of addresses with which to attempt to contact the calling party to provide information concerning the status of delivery of the message to the called station, said user contact database being further configured to store periods of time when each of the plurality of addresses can contact the calling party;
  a processor configured to attempt to deliver the message to the called station by initiating a communication to the called station, the processor being configured to determine whether the message delivery attempt was successful and, in response to successful delivery of the message, to attempt to notify the calling party that the message to the called station was successfully delivered, said notification attempt being sent to at least one of the plurality of addresses of the calling party based on the time the notification attempt was sent.

10. A system in accordance with claim 9 wherein the processor is further configured to send an e-mail message to attempt to notify the calling party that the message to the called station was successfully delivered.

11. A system in accordance with claim 9 wherein the processor is further configured to send a page to a pager to attempt to notify the calling party that the message to the called station was successfully delivered.

12. A system in accordance with claim 9 wherein the processor is further configured to initiate a phone call to attempt to notify the calling party that the message to the called station was successfully delivered.

13. A system in accordance with claim 9 wherein the processor is further configured to initiate a call and play a voice message to attempt to notify the calling party that the message to the called station was successfully delivered.

14. A system in accordance with claim 9 wherein the processor is further configured to, in response to cancellation of delivery of the message, attempt to notify the calling party that the message to the called station was not successfully delivered.

15. A method of delivering voice mail messages from a caller placing a collect call from a calling station to a called party at a called station, the method comprising:
  coupling the collect call from the calling station to a messaging platform via a bridging switch;
  collecting, at the messaging platform, information identifying the called station of the collect call from the caller;
  originating a completion call from the messaging platform to the called station using a public switched telephone network, based on the collected information identifying the called station;
  detecting at the messaging platform whether the completion call is answered by the called station;
  obtaining at the messaging platform a voice message from the caller if the completion call is not answered;
  attempting to deliver the message to the called party from the messaging platform by originating a call from the messaging platform to the called station;
  billing the called party for the voice message, if the called party accepts the voice message; and
  in response to successful delivery of the message, attempting to notify the calling party that the message to the called party was successfully delivered by originating a message from the messaging platform to the calling station.

16. A method in accordance with claim 15 wherein attempting to deliver the message to the called party from the messaging platform comprises:
  originating a message delivery call from the messaging platform to the called station;
  prompting the called party to accept delivery of the voice message, if the called party answers the message delivery call; and
  delivering the voice message, if the called party accepts delivery of the voice message.

17. A method in accordance with claim 15 and further comprising, in response to failure of delivery of the message, attempting to notify the calling party that the message to the called party was not successfully delivered.

18. A method in accordance with claim 17 wherein attempting to notify the calling party that the message to the called party was not successfully delivered comprises sending an e-mail message.

19. A method in accordance with claim 17 wherein attempting to notify the calling party that the message to the called party was not successfully delivered comprises sending a page to a pager.

20. A method in accordance with claim 17 wherein attempting to notify the calling party that the message to the called party was not successfully delivered comprises initiating a phone call to the calling party.

21. A method in accordance with claim 17 wherein attempting to notify the calling party that the message to the called party was not successfully delivered comprises initiating a phone call to the calling party using voice over IP.

22. A method in accordance with claim 17 wherein attempting to notify the calling party that the message to the called party was not successfully delivered comprises initiating a call and playing a voice message to the calling party.

23. A method in accordance with claim 17 wherein the step of attempting to notify the calling party that the message to the called party was not successfully delivered comprises:
  automatically determining an address of the calling station; and
  attempting to inform of the unsuccessful message delivery based on the determined address.

24. A method in accordance with claim 23 wherein the step of automatically determining the address of the calling station comprises using automatic number identification (ANI).

25. A method in accordance with claim 15 wherein the step of attempting to notify the calling party that the message to the called party was successfully delivered comprises:

automatically determining an address of the calling station; and attempting to inform of the successful message delivery based on the determined address.

26. A method in accordance with claim 25 wherein the step of automatically determining the address of the calling station comprises using automatic number identification (ANI).

27. A system for delivering voice mail messages from a caller placing a collect call from a calling station to a called party at a called station, the system comprising:

a messaging platform;

a bridging switch configured to couple the collect call from the calling station to the messaging platform, the messaging platform being configured to collect information identifying the called station of the collect call from the caller, originate a completion call from the messaging platform to the called station using a public switched telephone network, based on the collected information identifying the called station, detect whether the completion call is answered by the called station, obtain a voice message from the caller if the completion call is not answered, attempt to deliver the message to the called party by originating a call from the messaging platform to the called station, and in response to successful delivery of the message, attempt to notify the calling party that the message to the called party was successfully delivered by originating a message from the messaging platform to the calling station; and a billing system configured to extract billing information from said bridging switch for billing the called party for the voice message, if the called party accepts the voice message.

28. A system in accordance with claim 27 wherein the messaging platform is further configured to, in response to failure of delivery of the message, attempt to notify the calling party that the message to the called party was not successfully delivered.

29. A system in accordance with claim 28 wherein the messaging platform is configured to attempt to notify the calling party that the message to the called party was not successfully delivered by sending an e-mail.

30. A system in accordance with claim 28 wherein the messaging platform is configured to attempt to notify the calling party that the message to the called party was not successfully delivered by sending a page to a pager.

31. A system in accordance with claim 28 wherein the messaging platform is configured to attempt to notify the calling party that the message to the called party was not successfully delivered by initiating a phone call.

32. A system in accordance with claim 28 wherein the messaging platform is configured to attempt to notify the calling party that the message to the called party was not successfully delivered by initiating system in accordance with claim 28 wherein the messaging platform is configured to attempt to notify the calling party that the message to the called party was not successfully delivered by initiating a phone call and playing a voice message.

33. A system in accordance with claim 28 wherein the messaging platform is further configured to automatically determine an address of the calling station; and attempt to inform of the unsuccessful message delivery based on the determined address.

34. A system in accordance with claim 33 wherein the messaging platform is further configured to automatically determine the address of the calling station using automatic number identification (ANI).

35. A system in accordance with claim 27 wherein the messaging platform is further configured to automatically determine an address of the calling station; and attempt to inform of the successful message delivery based on the determined address.

36. A system in accordance with claim 35 wherein the messaging platform is further configured to automatically determine the address of the calling station using automatic number identification (ANI).

* * * * *